United States Patent
Sakamoto et al.

(10) Patent No.: US 10,592,150 B2
(45) Date of Patent: Mar. 17, 2020

(54) STORAGE APPARATUS

(71) Applicant: Hitachi, Ltd., Tokyo (JP)

(72) Inventors: Keisuke Sakamoto, Tokyo (JP); Hisaharu Takeuchi, Tokyo (JP); Haruki Takei, Tokyo (JP); Hajime Ikeda, Tokyo (JP)

(73) Assignee: Hitachi, Ltd., Tokyo (JP)

(*) Notice: Subject to any disclaimer, the term of this patent is extended or adjusted under 35 U.S.C. 154(b) by 43 days.

(21) Appl. No.: 15/759,842

(22) PCT Filed: Feb. 15, 2016

(86) PCT No.: PCT/JP2016/054288
§ 371 (c)(1),
(2) Date: Mar. 14, 2018

(87) PCT Pub. No.: WO2017/141315
PCT Pub. Date: Aug. 24, 2017

(65) Prior Publication Data
US 2018/0253253 A1    Sep. 6, 2018

(51) Int. Cl.
*G06F 12/00* (2006.01)
*G06F 3/06* (2006.01)
*G06F 12/02* (2006.01)

(52) U.S. Cl.
CPC .......... *G06F 3/0641* (2013.01); *G06F 3/0608* (2013.01); *G06F 3/0673* (2013.01);
(Continued)

(58) Field of Classification Search
CPC .... G06F 3/0641; G06F 3/0608; G06F 3/0673; G06F 12/00
See application file for complete search history.

(56) References Cited

U.S. PATENT DOCUMENTS 8,224,875 B1 * 7/2012 Christiaens .......... G06F 16/215
707/813
2011/0238914 A1    9/2011 Hirayama
(Continued)

FOREIGN PATENT DOCUMENTS

JP       5216915 B2      6/2013
WO    2011/121905 A1   10/2011
(Continued)

OTHER PUBLICATIONS

International Search Report of PCT/JP2016/054288 dated Mar. 15, 2016.

*Primary Examiner* — Charles Rones
*Assistant Examiner* — Han V Doan
(74) *Attorney, Agent, or Firm* — Mattingly & Malur, PC

(57) ABSTRACT

A storage apparatus according to an aspect of the present invention is configured to perform a deduplication process on write data from a host. For the deduplication process, the storage apparatus calculates a feature value of write data, and records, in a management region, metadata that is a set of the feature value of the write data and information on a storage position of the write data. However, to prevent the amount of metadata stored in the management region from increasing, if write data meets a predetermined condition, the storage apparatus does not perform the deduplication process, and suppresses creation of metadata of the write data.

13 Claims, 17 Drawing Sheets

(52) U.S. Cl.
 CPC .......... *G06F 12/00* (2013.01); *G06F 12/0246* (2013.01); *G06F 2212/7205* (2013.01); *G06F 2212/7207* (2013.01)

(56) References Cited

U.S. PATENT DOCUMENTS

| | | |
|---|---|---|
| 2013/0013570 A1 | 1/2013 | Yamakawa |
| 2014/0229452 A1* | 8/2014 | Serita .................. G06F 16/1748 707/692 |
| 2015/0142755 A1 | 5/2015 | Kishi |
| 2016/0011789 A1 | 1/2016 | Tsuchiya et al. |

FOREIGN PATENT DOCUMENTS

| | | | |
|---|---|---|---|
| WO | 2013/051129 A1 | 4/2013 | |
| WO | 2014/030252 A1 | 2/2014 | |
| WO | WO-2014030252 A1 * | 2/2014 | ............. G06F 12/04 |
| WO | 2014/157243 A1 | 10/2014 | |

* cited by examiner

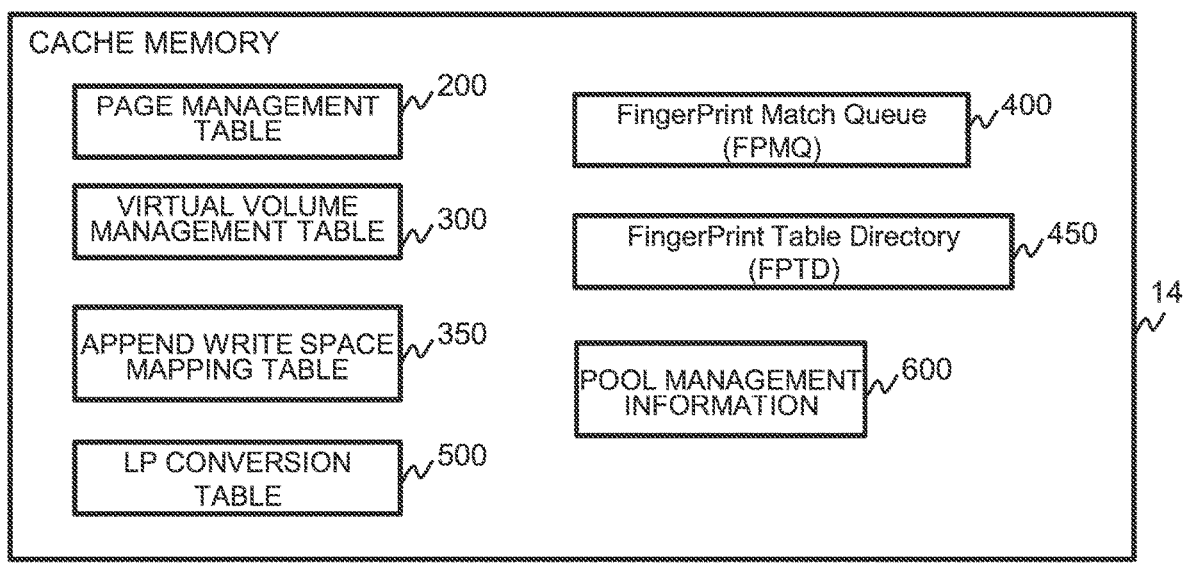

Fig. 5

| POOL NUMBER 601 | VIRTUAL VOLUME 605 | NUMBER OF CUMULATIVE DEDUPLICATION TARGET CHUNKS 602 | NUMBER OF METADATA DELETION CHUNKS 603 | LAST WRITE POSITION 604 |
|---|---|---|---|---|
| 0 | 0, 1, 2,... | 100 | 200 | 0x0012 |
| 1 | 1001, 1002,... | 400 | 500 | 0x0001 |
| ... | ... | ... | ... | ... |

POOL MANAGEMENT INFORMATION 600

Fig. 6

| VIRTUAL PAGE # ~301 | NUMBER OF SEQUENTIAL WRs ~302 | NUMBER OF RANDOM WRs ~303 | LAST UPDATE TIME ~304 | PAGE TYPE ~305 | PAGE # ~306 | POOL # ~307 | NUMBER OF METADATA REDUCTION CHUNKS ~308 |
|---|---|---|---|---|---|---|---|
| 0 | 0 | 100 | 2015/1/1 10:00 | 1 | 0 | 0 | 0 |
| 1 | 50 | 50 | 2015/2/1 10:00 | 1 | 1 | 1 | 0 |
| 2 | 100 | 0 | 2015/3/1 10:00 | 0 | null | null | 100 |
| 3 | 100 | 0 | 2015/4/1 10:00 | 0 | null | null | 200 |
| ... | ... | ... | ... | ... | ... | ... | ... |

VIRTUAL VOLUME MANAGEMENT TABLE 300

PAGE TYPE:
0=APPEND WRITE
1=OVERWRITE

Fig. 7

| APPEND WRITE PAGE # /351 | PAGE # /352 | POOL # /353 | IN-PAGE LAST WRITE POSITION /354 |
|---|---|---|---|
| 0 | 3 | 0 | 0x14FFD |
| 1 | 4 | 0 | 0x14FF0 |
| 2 | 22 | 0 | 0x00005 |
| ... | ... | ... | ... |
| ... | ... | ... | ... |

APPEND WRITE SPACE MAPPING TABLE 350

Fig. 8

| LA /501 | FPK UPPER 32 bits /502 | PA /503 | Length /504 | FPMQ ENTRY /505 |
|---|---|---|---|---|
| 0x0000000000 | 0x11111111 | 0x1111111111 | 512 | 1 |
| 0x0000000001 | 0x22222222 | 0x2222222222 | 512 | 1 |
| 0x0000000002 | 0x33333333 | 0x3333333333 | 1536 | 0 |
| 0x0000000003 | 0x44444444 | 0x4444444444 | 2048 | 1 |
| 0x0000000004 | 0x55555555 | 0x5555555555 | 1024 | 1 |
| ... | ... | ... | | |
| 0xbbbbbbbbb0 | 0x66666666 | 0x6666666666 | 1024 | 1 |
| 0xbbbbbbbbb1 | 0x00000002 | 0x7777777777 | 512 | 1 |
| 0xbbbbbbbbb2 | 0x77777777 | 0x8888888888 | 1536 | 1 |
| ... | ... | ... | | |
| 0xccccccccc1 | 0x88888888 | 0x9999999999 | 1024 | 0 |
| 0xccccccccc2 | 0x00000002 | 0x7777777777 | 512 | 1 |
| 0xccccccccc3 | 0x99999999 | 0xaaaaaaaaaa | 512 | 1 |
| ... | ... | ... | ... | ... |

LP CONVERSION TABLE 500

FPMQ ENTRY:
0=NO ENTRY
1=DONE (ENTERED)

STORAGE APPARATUS

TECHNICAL FIELD

The present invention relates to a storage apparatus.

BACKGROUND ART

A storage apparatus includes a plurality of storage devices that stores therein data and a storage controller that controls the storage devices, and is intended to provide a host computer with a large-capacity data storage space.

There is a demand for a storage apparatus to save a large amount of data at low cost. To satisfy the demand, there is known a technology to record data after performing lossless compression (hereinafter, referred to simply as compression) on the data. By reducing the data size by compressing data and then recording the data in a storage device, more data can be stored in a storage apparatus than data is recorded in the storage device without being compressed. Accordingly, it is possible to reduce the cost for holding data (the bit cost of a storage medium, the power consumption cost of the storage apparatus, etc.).

As another technology to reduce the amount of data to be stored, there is deduplication technology. It is a technology for a storage apparatus, for example, when having detected that multiple pieces of data with the same content exist in the storage apparatus, to retain one of them in a storage device included in the storage apparatus and not to store the other pieces of data in a storage device.

Compression technology and deduplication technology can be used in combination. For example, Patent Document 1 discloses a storage apparatus that performs a deduplication process on duplicate data in pieces of data transferred from a higher-level device, and compresses data that has not been subjected to deduplication.

CITATION LIST

Patent Document

Patent Document 1: Japanese Patent No. 5216915

SUMMARY OF THE INVENTION

Problem to be Solved by the Invention

If multiple pieces of data are compared with respect to each byte or bit to determine the presence or absence of the same data, the processing time becomes longer. Therefore, in deduplication technology, the feature value (such as the hash value) of data may be calculated by using a hash function to use the calculated hash value for determination of the presence or absence of the same data. This is because since the feature value (such as the hash value) calculated from data is about the size of a few bytes, comparing the feature values makes the determination of whether it is the same or different faster. Accordingly, also in the storage apparatus disclosed in Patent Document 1, the hash value is used in determination of duplication.

Specifically, the storage apparatus stores and holds a storage position of data that has been stored in a storage device and a hash value of the data in management information such as a hash table. When new data is written onto the storage apparatus, the storage apparatus calculates a hash value of this data, and determines whether the calculated hash value already exists in the hash table.

The amount (size) of management information such as a hash table increases in proportion to the data amount stored in the storage apparatus. From the viewpoint of access performance of the storage apparatus, it is preferable to store the management information in a storage region with high access performance, such as a cache memory. However, if the amount of management information increases, it becomes difficult to hold the management information in a storage region with high access performance.

Means for Solving the Problems

A storage apparatus according to an aspect of the present invention is configured to perform a deduplication process on write data from a host, and, for the deduplication process, records metadata, which is a set of a feature value of the write data and storage position information of the write data, in a management region. However, in case the write data meets a predetermined condition, the creation of metadata of the write data is not performed.

Advantageous Effect of the Invention

According to a storage apparatus according to an aspect of the present invention, it is possible to suppress the size of management information required for a deduplication process.

BRIEF DESCRIPTION OF THE DRAWINGS

FIG. 3 is a list of management information.
FIG. 4 is a configuration example of a page management table.
FIG. 5 is a configuration example of pool management information.
FIG. 6 is a configuration example of a virtual volume management table.
FIG. 7 is a configuration example of an append write space mapping table.
FIG. 8 is a configuration example of a logical-physical conversion table.

MODES FOR CARRYING OUT THE INVENTION

Figure 1:
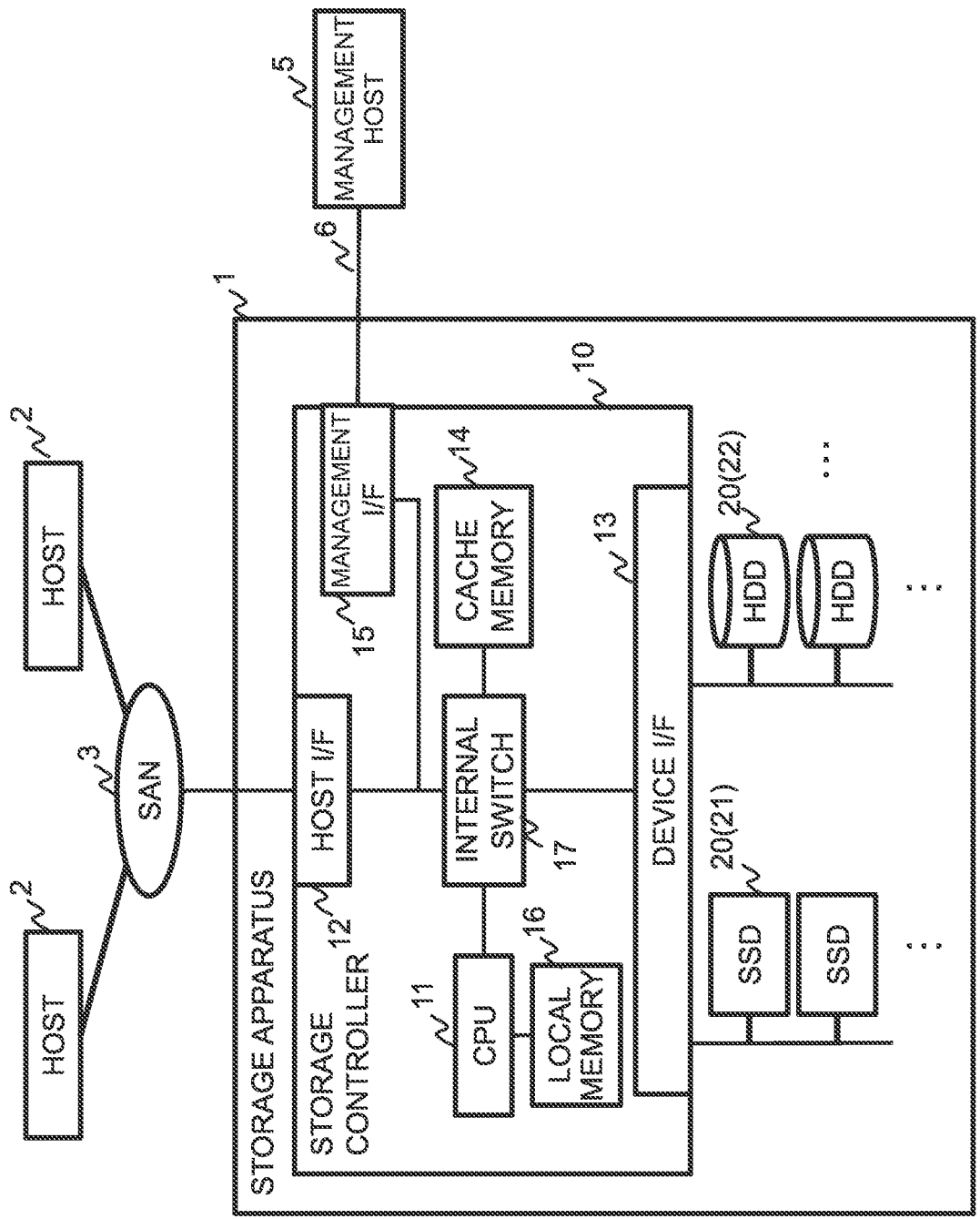
FIG. 1 is a configuration example of a computer system, including a storage apparatus according to an embodiment.

Several embodiments will be described below with drawings.

Incidentally, in the following embodiments, a "program" may be described as the subject of a process performed in a storage apparatus. In reality, a processor (a CPU) included in the storage apparatus executes a program, thereby a process written in the program is performed, and thus the subject of the process is the processor (the CPU). However, to prevent description from being lengthy, the content of the process may be described with the program as the subject. Furthermore, part or all of a program can be realized by dedicated hardware. Moreover, various programs described below can be provided by means of program-distribution-server- or computer-readable storage media and be installed in each apparatus that executes the programs. The computer-readable storage media are a non-temporary computer-readable medium, and are a non-volatile storage medium such as an IC card, an SD card, or a DVD.

Before going into description of the embodiments, various terms used in the embodiments are explained.

In the present specification, "compression" means a process of reducing the data size while maintaining the meaning of data by using a lossless compression algorithm such as an LZW algorithm. Storage apparatus according to the embodiments may perform compression of data written from a host onto the storage apparatus. Data whose size has been reduced through a compression process performed in the storage apparatus is referred to as "compressed data", and data that has not been subjected to a compression process in the storage apparatus is referred to as "non-compressed data". Furthermore, a process of restoring compressed data to the original data size by using a lossless compression algorithm is referred to as "decompression".

Furthermore, in the embodiments described below, a "compression rate" is used as an index of data reduction efficiency due to data compression. The compression rate in the embodiments is to be defined by the following calculation formula.

Compression rate=(size of non-compressed data−size of compressed data)÷size of non-compressed data In the following embodiments, phrases such as "low in the compression rate" and "high in the compression rate" are used; in that case, the compression rate is to be defined by the above calculation formula. Therefore, if data after compression is phrased as "low in the compression rate" or "small in the compression rate", that means the data is not much reduced by the compression. For example, if the data size has not at all been changed as a result of a compression process, the compression rate is 0. On the other hand, "high in the compression rate" means the data reduction amount due to compression is large.

The term "volume" means a storage space that a target device, such as the storage apparatus or a storage device, provides to an initiator device, such as a host computer. When the initiator device has issued a request to write data in a position (an address) on the storage space, the data is stored in a storage region assigned to the address. The storage apparatus according to the embodiments provides a host with a virtual volume formed by so-called thin provisioning technology as a volume. In an initial state of the virtual volume (just after the virtual volume is defined), each address on the virtual volume is not assigned a storage region. Once the storage apparatus receives a request to write data in an address on the storage space from an initiator device (a host), the storage apparatus dynamically determines a storage region to be assigned to the address.

The term "block" means a region on a volume. Furthermore, in the embodiments described below, a block is a region of a size equal to a minimum access unit when an initiator device accesses a volume, and is fixed-length. The size of a block is, as an example, 512 bytes. When the initiator device accesses a region on the volume, the initiator device accesses by designating an address assigned to each block. This address is referred to as a "logical block address (LBA)". An LBA of the first block of the volume is 0, and the subsequent blocks are assigned consecutive numbers 1, 2, . . . in order. Moreover, in the following embodiments, the storage apparatus may use an address other than an LBA as an address that identifies a region on a volume. This will be described in the embodiments.

A "deduplication process" is a process of, when multiple pieces of data with the same content exist in the storage apparatus, retaining only one piece of data in the storage apparatus and deleting the other pieces of data from the storage apparatus. A process of determining whether data with the same content exists in the storage apparatus is referred to as a "duplication determination" process. Incidentally, unless otherwise specifically noted, the deduplication process includes the duplication determination process.

In the storage apparatus according to the embodiments described below, duplication determination is performed on each data of a predetermined size called chunk. In the following embodiments, there is described an example of a case where a chunk has a size of 8 KB; the size of a chunk can be a size other than 8 KB. Data (or a chunk) with the same content is referred to as "duplicate data (or a duplicate chunk)".

In duplication determination, if two pieces of data are compared with respect to each bit or byte, it takes a long time to perform the determination process. Therefore, in general, an apparatus that performs duplication determination performs an operation (such as an operation using a hash function) on data to be compared, thereby generating a feature value of a small size (for example, about 8 bytes), and performs duplication determination using the feature value. In the following embodiments, a feature value generated from data is referred to as a "FingerPrint Key". The FingerPrint Key may be abbreviated as FPK.

In the embodiments described below, in a case where the value of FPK calculated from data A is H, the value H is referred to as FPK of data A. Furthermore, data A may be referred to as "data having FPK H".

The term "range of deduplication" means the data search range when the presence or absence of duplicate data is determined. For example, in a case where the range of deduplication is the "storage apparatus", when the storage apparatus determines whether the same data as data A exists, the storage apparatus compared data A with all pieces of data in the storage apparatus. On the other hand, in a case where the range of deduplication is limited to some storage devices (referred to as a "storage group" here) in the storage apparatus, when the storage apparatus determines the presence or absence of duplicate data, the storage apparatus looks at the presence or absence of duplicate data in only data in the storage group.

The term "update" of a storage region means to rewrite (overwrite) the content of data that has been stored in the storage region with new content. Data that has been stored in a storage region before the storage region is updated is referred to as "pre-update data". On the other hand, data newly written in the storage region is referred to as "update data" or "post-update data".

The term "append write" or "append" means an action of sequentially writing data in an unused area of a storage region. The storage apparatus in the following embodiments is provided with a storage region for append write. When the storage apparatus performs an append write process, the storage apparatus writes data in order from the head of the storage region for append write. The storage apparatus stores therein an end address in which data has been written through the append write process performed last, and, when performing an append write process, writes data in from the next address of the end address.

Embodiment 1

(1) System Configuration

FIG. 1 shows a configuration example of a computer system including a storage apparatus 1 according to a first embodiment. The storage apparatus 1 includes a storage controller 10 and a plurality of storage devices 20 connected to the storage controller 10.

The storage devices 20 are used for the storage apparatus 1 to store write data from a higher-level device, such as a host 2. As the storage devices, for example, HDDs (hard disk drives) 22, which use a magnetic disk as a storage medium, and SSDs (solid state drives) 21, which adopt a non-volatile semiconductor memory such as a flash memory as a storage medium, are used. The storage devices 20 are connected to the storage controller 10, for example, by a transmission line in conformity with the SAS (serial attached SCSI) standard (an SAS link), a transmission line in conformity with the PCI (peripheral component interconnect) standard (a PCI link), or the like.

One or more hosts 2 are connected to the storage controller 10. Furthermore, a management host 5 is connected to the storage controller 10. The storage controller 10 and the hosts 2 are connected via an SAN (storage area network) 3 formed by using, for example, Fibre Channel. The storage controller 10 and the management host 5 are connected via a LAN (local area network) 6 formed by using, for example, Ethernet.

The storage controller 10 includes at least a processor (also referred to as a CPU) 11, a host interface (also referred to as a "host I/F") 12, a device interface (also referred to as a "device I/F") 13, a cache memory 14, a management I/F 15, and a local memory 16. Then, the CPU 11, the host I/F 12, the device I/F 13, the cache memory 14, and the management I/F 15 are connected to one another through an internal switch (also referred to as an internal SW) 17. In FIG. 1, the number of each of these components depicted is one; however, to ensure high performance and high availability, more than one of each component can be installed in the storage controller 10. Furthermore, the components can be configured to be connected to one another through not the internal SW 17 but a common bus.

The device I/F 13 includes at least an interface controller and a transfer circuit. The interface controller is a component for converting a protocol used in a storage device 20 (for example, SAS) into a communication protocol used in the storage controller 10 (for example, PCI-Express). The transfer circuit is used when the storage controller 10 performs data transfer (read, write) to a storage device 20.

The host I/F 12 includes at least an interface controller and a transfer circuit, just like the device I/F 13. The interface controller included in the host I/F 12 is for converting between a communication protocol used in a data transfer path between a host 2 and the storage controller 10 (for example, Fibre Channel) and the communication protocol used in the storage controller 10.

The CPU 11 performs a variety of controls of the storage apparatus 1. A program (referred to as a storage control program) executed by the CPU 11 is stored in the local memory 16. Furthermore, the CPU 11 uses a portion of a storage region on the local memory 16 as a kind of work area when performing a data compression process. A volatile storage medium, such as a DRAM or an SRAM, is used in the local memory 16; however, as another practical example, a non-volatile storage medium can also be used.

The cache memory 14 is used to temporarily store I/O target data to a storage device 20. Furthermore, the cache memory 14 is used to store various management information of the storage apparatus 1 that the CPU 11 uses. A volatile storage medium, such as a DRAM or an SRAM, is used in the cache memory 14; however, as another practical example, the cache memory 14 can be made up of a non-volatile memory. Moreover, in a case where a volatile storage medium is used in the cache memory 14, the storage apparatus 1 can be configured to be equipped with an auxiliary power supply such as a battery so as to preserve the content stored in the cache memory 14 in case of power outage.

In the storage apparatus 1 according to the present embodiment, the CPU 11 is configured to be able to access both the local memory 16 and the cache memory 14. However, when accessing the cache memory 14, the CPU 11 accesses the cache memory 14 through the internal SW 17. Therefore, the response time when the CPU 11 accesses the cache memory 14 is longer than the response time when the CPU 11 accesses the local memory 16.

The management host 5 is a computer for performing management operation of the storage apparatus 1. The management host 5 is provided with input/output devices (not shown) such as a keyboard and a display, and a user (an administrator) can issue a setting instruction to the storage apparatus 1 by using such an input/output device. Furthermore, the management host 5 can display information such as the state of the storage apparatus 1 on the input/output device such as the display.

The storage apparatus 1 according to the present embodiment can compress data to be stored in a storage device 20. The compression of the data is performed by the CPU 11 (the compression is performed by executing a program code for the CPU 11 to perform data compression). However, as another practical example, the storage controller 10 can be provided with dedicated hardware for performing data compression and be configured to perform data compression by using this hardware.

(2) Management of Storage Region

Subsequently, there is described a storage region that the storage apparatus 1 according to the present embodiment manages. The one or more storage devices 20 that the storage apparatus 1 according to the present embodiment includes provide the storage controller 10 with a storage space of a predetermined size. However, the storage controller 10 does not directly provide a host 2 with a storage space provided by a storage device 20. The storage controller 10 provides a host 2 with one or more virtual storage spaces different from the storage space provided by the storage device 20. These virtual storage spaces are referred to as a "virtual volume". Furthermore, the virtual volume (the storage spaces provided to the host 2) may also be referred to as an "overwrite space".

The virtual volume is a volume formed by the publicly known thin provisioning technology. Once the storage apparatus 1 receives a request to access a region on a virtual volume from a host 2, the storage apparatus 1 assigns (maps) a storage region of a storage device 20 to the region.

In the present embodiment, of the multiple storage devices 20 that the storage apparatus 1 includes, a storage device 20 that can be assigned to a virtual volume is attached to a management unit called "pool". The storage apparatus 1 divides a storage space of the storage device 20 belonging to the pool into subregions of a predetermined size (for example, 42 MB) and manages the subregions. In the present embodiment, this subregion is referred to as a "page" or a "physical page". Incidentally, multiple pools can be provided in the storage apparatus 1. Each pool is assigned a unique identification number in the storage apparatus 1, and this identification number is referred to as a pool number (pool #). Furthermore, a pool with pool # k is written as "pool # k".

When the storage apparatus 1 assigns a storage region of a storage device 20 to a virtual volume, the storage apparatus 1 assigns it with respect to each page. Therefore, the storage apparatus 1 also divides a virtual volume into regions of the same size as a page and manages the regions. This region of the same size as a page on the virtual volume is referred to as a "virtual page" or an "overwrite page". Incidentally, in the present embodiment, there is described an example of a case where the size of a virtual page is 42 MB; however, the size of a virtual page can be a size other than this.

When a host 2 accesses a virtual volume, the host 2 issues an access request (such as a read request or a write request) to the storage apparatus 1. The read request or the write request includes an identifier (such as a logical unit number (LUN)) for identifying a virtual volume to be accessed and information that identifies a region on the virtual volume. The information that identifies a region on the virtual volume includes a logical block address (LBA) and information about the length of the region. When the storage apparatus 1 has received a write request from a host 2, the storage apparatus 1 identifies a virtual page to be accessed from information that identifies a region on a virtual volume (an LBA and the length of the region). In case the virtual page to be accessed has not yet been assigned a page, the storage apparatus 1 selects, of pages belonging to a pool, an unused page (a page that has not yet been assigned to a virtual page), and assigns (maps) the selected page to the virtual page to be accessed. Write data from the host 2 is stored in the page mapped to this virtual page to be accessed.

Furthermore, the storage apparatus 1 stores a correspondence relation (mapping) between a virtual page and a page assigned to the virtual page in a mapping table (such as a virtual volume management table 300 to be described later). When receiving a read request to a virtual page, the storage apparatus 1 identifies a page assigned to the virtual page by reference to the mapping table, and reads data from the identified page.

Figure 2:
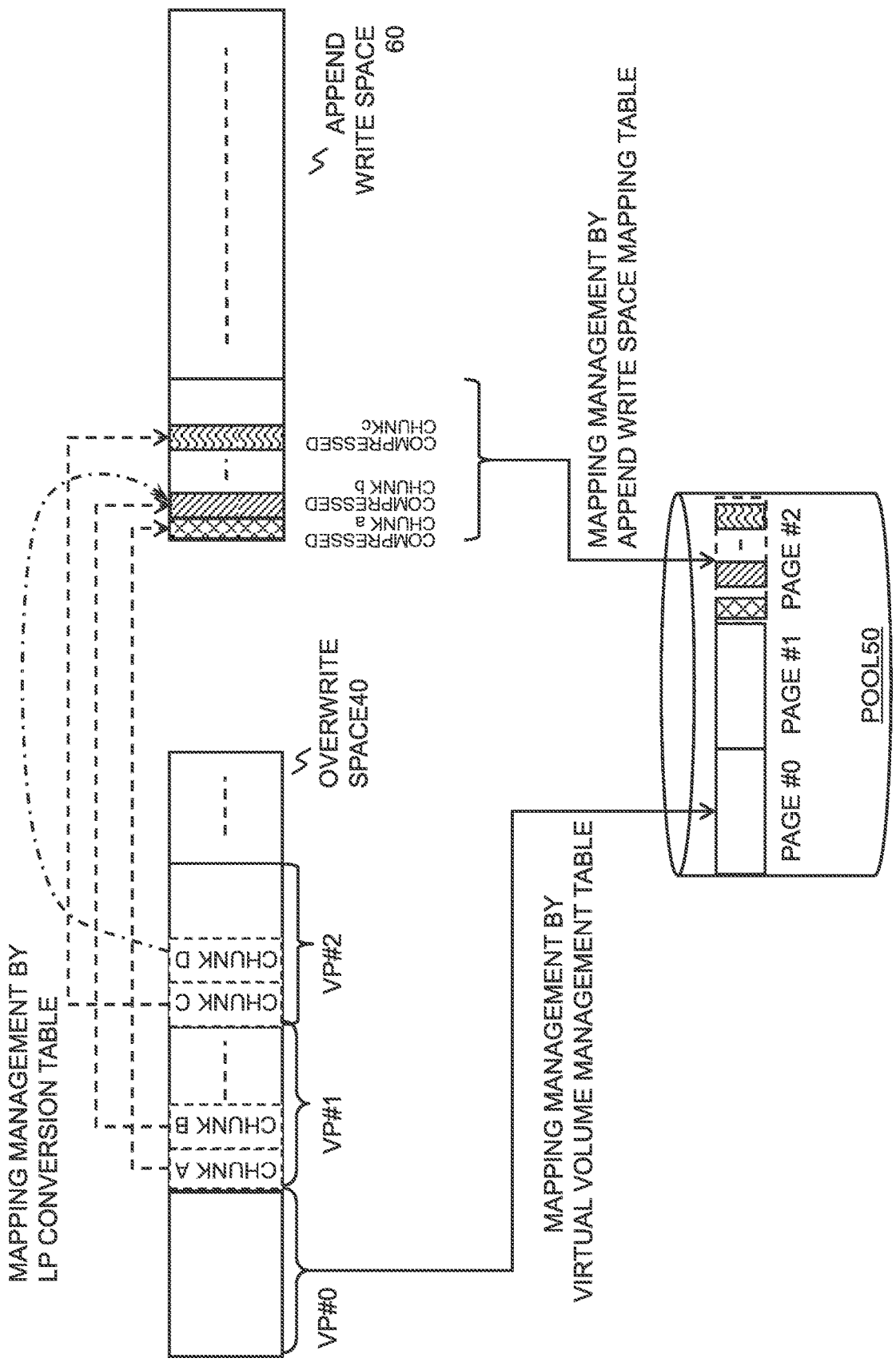
FIG. 2 is a diagram representing a relationship between a virtual volume and a page.

FIG. 2 is a conceptual diagram representing a relationship between a virtual volume and a storage region (a page) assigned to the virtual volume. A rectangular object 40 shown in FIG. 2 represents a virtual volume (an overwrite space). Furthermore, a columnar object 50 represents a pool.

Furthermore, the storage apparatus 1 has a storage space different from the virtual volume (the overwrite space) 40. This storage space is referred to as an "append write space". A rectangular object 60 shown in FIG. 2 represents the append write space. The append write space 60 is not a storage space that a host 2 can access but a storage space that only the storage controller 10 can use. The append write space 60 is used for the CPU 11 of the storage controller 10 to store compressed data in a storage device.

First, a relationship between a virtual page and a physical page in an overwrite space is explained. Each virtual page is assigned a unique identification number (a non-negative integer value is used as an identification number) that is referred to as a virtual page number (may be written as VP #). In the following, a virtual page with virtual page number n (n is a non-negative integer value) is written as "VP # n". Likewise, each physical page is assigned a unique identification number (this identification number is also a non-negative integer value) in the storage apparatus 1 that is referred to as a physical page number (or page #). In the following, a physical page with physical page number n (n is a non-negative integer value) is written as "page # n". In an example of FIG. 2, there is shown an example where page #0 is mapped to VP #0. VP #1 and VP #2 will be described later.

When the storage apparatus 1 has received a write request (and write data) in a region (one or multiple blocks) in a virtual page from a host 2, the write data is stored in a block in a physical page mapped to the virtual page. The storage apparatus 1 stores and manages a correspondence relation (mapping) between the virtual page and the physical page in the virtual volume management table 300 to be described later.

In principle (except for a case of compressed data storage to be described later), when the storage apparatus 1 according to the present embodiment has received a request to write data in the nth block from the head of a virtual page, the data is stored in the nth block from the head of a physical page mapped to the virtual page. Incidentally, to prevent description from being lengthy, in the following, a process for the storage apparatus 1 to store data in a physical page assigned to a virtual page is expressed as "storing data in a virtual page (or an overwrite space)".

Just like the overwrite space, an append write space is also a storage space formed by the so-called thin provisioning technology. The storage controller 10 dynamically assigns a page (a physical page) to a region on the append write space, and data is written in the physical page assigned to the append write space. In the same manner as the overwrite space, the storage apparatus 1 divides the append write space into regions of the same size as a physical page and manages the regions. This region is referred to as an "append write page". Furthermore, an append write page is also assigned a unique identification number that is referred to as an append write page number. The append write page number may be written as append write page #. The storage apparatus 1 stores and manages a correspondence relation (mapping) between the append write page and the physical page in an append write space mapping table 350 to be described later. Moreover, to prevent description from being lengthy, in the following, a process for the storage apparatus 1 to write data in a physical page assigned to an append write page is expressed as "writing data in an append write page (or an append write space)".

As described above, data written in an append write space is compressed data. Furthermore, an append write space is provided with respect to each pool, and, if there are n pools, n append write spaces exist. Just like a physical page assigned to a virtual page, a physical page assigned to an append write space is an unused physical page selected from a pool. When a chunk of a virtual volume assigned a physical page with pool # k is moved to an append write space, a physical page assigned to this append write space is the physical page with pool # k.

The storage apparatus 1 performs a compression process on data (non-compressed data) written in a virtual page from a host 2 if needed. Compressed data generated through the compression process is moved to a different position from the physical page in which the non-compressed data has been stored, specifically, to an append write space. Furthermore, at this time, determination of the presence or absence of duplicate data is also performed.

The storage apparatus 1 according to the present embodiment divides a region of a virtual page into subregions of 8 KB in order from the head of the virtual page, and performs data compression with respect to each of the subregions. In the present embodiment, this subregion of 8 KB (or data that has been stored in this subregion) is referred to as a "chunk". Incidentally, a size other than 8 KB can be adopted as the size of a chunk. Furthermore, data generated by compressing a chunk is referred to as a "compressed chunk". Although the size of a compressed chunk changes depending on the content of data, it is 512 bytes at minimum and 8 KB at maximum. Moreover, the storage apparatus 1 according to the present embodiment generates a compressed chunk of a size of the integral multiple of 512 bytes.

When (the CPU 11 of) the storage controller 10 has generated a compressed chunk, the storage controller 10 appends the compressed chunk to an append write space. When chunks of a virtual page all have been compressed, and compressed chunks all have been written in the append write space, a page assigned to the virtual page is discarded. Specifically, the page assigned to the virtual page is changed into an unused state (a state of being not assigned to a virtual page). This moves the data written in an overwrite space to the append write space. Incidentally, chunks (compressed chunks) of multiple virtual pages may be stored in a physical page assigned to the append write space. This is because the size of the chunks is reduced by compression, and data of multiple virtual pages may be able to be contained in one physical page. Furthermore, the storage apparatus 1 stores and manages a correspondence relation (mapping) between the chunk on the overwrite space and the compressed chunk on the append write space in an LP conversion table 500 to be described later.

With respect to a virtual page of which the data written from a host 2 has moved to an append write space, if there is a request to write update data (i.e., an update request) from the host 2, the update data is compressed and appended to the append write space. However, as another practical example, the storage apparatus 1 can again assign a physical page to a virtual page of an overwrite space, and decompress the data moved to the append write space, and write back the decompressed data in the physical page assigned to the virtual page, and then update (overwrite) the data on this physical page.

An address that the storage apparatus 1 uses to identify a chunk on an overwrite space is referred to as LA. The LA is an address assigned with respect to each chunk, and is in the following relationship: LA=LBA÷16.

Therefore, an LA of a chunk located in the head on the overwrite space is 0, and LAs of the subsequent chunks are consecutive numbers 1, 2, . . . in order.

Meanwhile, the length of a compressed chunk on the append write space is a variable length, and has a size of 512 bytes at minimum; therefore, an address is assigned with respect to each region (block) of 512 bytes on the append write space. This address is referred to a PA. A PA of a 512-byte region located in the head on the append write space is 0, and consecutive numbers 1, 2, . . . are used in order in PAs of the subsequent regions.

(3) Management Information

Subsequently, the content of management information used in the management of the above-described pools, virtual volumes (overwrite spaces), and append write spaces is described. Incidentally, in the present specification and the drawings, there is a numerical value with a character string "0x" added at the head thereof. This means the numerical value is written in hexadecimal.

FIG. 3 shows management information that the storage apparatus 1 includes. The storage apparatus 1 includes a page management table 200, the virtual volume management table 300, the append write space mapping table 350, the logical-physical conversion table (LP conversion table) 500, a FingerPrint Match Queue (FPMQ) 400, a FingerPrint Table Directory (FPTD) 450, and pool management information 600 on the cache memory 14.

FIG. 4 shows an example of the page management table 200 that is information for managing pages belonging to a pool. The page management table 200 is a table provided with respect to each pool; if n pools are provided, the storage apparatus 1 includes n page management tables 200.

In each line (record) of the page management table 200, information of a physical page in a pool is stored. Each record has fields of Page # (201), DEV # (202), Addr (203), and use (204). In Page # (201), a page number of a physical page is stored. That is, a record with Page # (201) of n is a record that manages information of page # n.

As described above, a page (a physical page) is a region on a storage device 20. In DEV # (202) and Addr (203), an identification number of a storage device 20 in which the physical page exists and an address in the storage device 20 are stored. In the case of FIG. 4, in a record that manages information of page #1, 0 has been stored in DEV # (202), and 0x15000 has been stored in Addr (203). Therefore, it means that page #1 corresponds to a region of 42 MB (a region equivalent to a size of one physical page) starting from an address 0x15000 in a storage device 20 with identification number 0.

In use (204), information representing the status of use of a physical page is stored. If a physical page has been mapped to a virtual volume or an append write space, "1" is stored in use (204). On the other hand, if a physical page has not been mapped to a virtual volume or an append write space, "0" is stored in use (204). A page with "1" stored in use (204) is referred to as an in-use page; on the other hand, a page with "0" stored in use (204) is referred to as an unused page.

Incidentally, in the present embodiment, there is described an example of a case where an identification number and an address of a storage device 20 (for example, an HDD) are entered in the page management table 200, and each page corresponds to a storage region in one storage device 20. However, another configuration method for a pool (or a page) can be adopted. For example, in a case where the storage apparatus 1 uses a RAID (redundant array of independent (or inexpensive) disks) technology to form one logical storage device (referred to as a logical device) from multiple storage devices 20, a storage region of a predetermined size (for example, 42 MB) on the logical device can be treated as a page. In that case, in DEV # (202) and Addr (203) of the page management table 200, an identification number of the logical device and an address in the logical device can be stored.

FIG. 5 shows an example of the pool management information 600. The pool management information 600 is a table for storing information of virtual volumes belonging to each pool and information on a deduplication process. If multiple pools exist, the storage apparatus 1 attaches each virtual volume to any one of the pools. When the storage apparatus 1 assigns a physical page to a virtual page of the virtual volume, the storage apparatus 1 selects an unused physical page in the pool to which the virtual volume belongs and assigns the physical page to a virtual page.

In each record of the pool management information 600, pieces of information of a pool number (601), a virtual volume # (605), the last write position (604), the number of cumulative deduplication target chunks (602), and the number of metadata deletion chunks (603) are stored. A pool number is stored in the pool number (601). An identification number of a virtual volume belonging to a pool (referred to as a virtual volume number) is stored in the virtual volume # (605). If multiple virtual volumes belonging to the pool exist, multiple virtual volume numbers are stored in the virtual volume # (605).

In the last write position (604), an append write page number of an append write page in which a compressed chunk has been written last is stored. When the storage controller 10 writes a compressed chunk in an append write page, the storage controller 10 identifies an append write page in which a compressed chunk has been written last by reference to the last write position (604).

The number of cumulative deduplication target chunks (602) and the number of metadata deletion chunks (603) are information used in a deduplication process, and their details will be described later.

FIG. 6 shows an example of the virtual volume management table 300.

The virtual volume management table 300 is also stored in the cache memory 14. In each record of the virtual volume management table 300, information about a virtual page in a virtual volume is stored. Specifically, pieces of information of virtual page # (301), the number of sequential WRs (302), the number of random WRs (303), the last update time (304), the page type (305), page # (306), pool # (307), and the number of metadata reduction chunks (308) are stored in each record.

In virtual page # (301), a virtual page number of a virtual page is stored. Furthermore, in page # (306), page # of a physical page assigned to the virtual page is stored. Pool # (307) is a pool number of a pool to which the physical page assigned to the virtual page belongs.

In the number of sequential WRs (302) and the number of random WRs (303), the number of write requests to the virtual page received from hosts 2 is stored. Specifically, the number of sequential write requests and the number of random write requests are stored in the number of sequential WRs (302) and the number of random WRs (303), respectively.

Incidentally, any method can be used in the method of determining whether a write request received from a host 2 is a sequential write request or a random write request. For example, when the storage apparatus 1 has received multiple write requests to a virtual page, if respective addresses (LBAs) specified in the write requests are consecutive, these write requests can be determined to be sequential write requests. On the other hand, a write request other than above can be determined to be a random write request.

In the last update time (304), the time at which a write request to the virtual page has been received last is stored. Each time the storage apparatus 1 receives a write request to a virtual page, the time at which the write request has been received is stored in the last update time (304) of the virtual page.

In the page type (305), 1 or 0 is stored. In an initial state, the page types (305) of all virtual pages have been set to 1.

If 0 has been stored in the page type (305), that means data written in the virtual page has been compressed and moved to an append write space. In this case, in both page # (306) and pool # (307), a null value (referred to as null; specifically, a value used in neither page # nor pool #, such as "−1") is stored. Furthermore, a storage location of the moved data (compressed chunk) is recorded in the LP conversion table 500 to be described later or somewhere.

On the other hand, if 1 has been stored in the page type (305), that means data written in the virtual page has not yet been moved to an append write space, or a write request to the virtual page has not yet issued from a host 2. If the page type (305) is 1, and a valid value (a non-null value) has been stored in both page # (306) and pool # (307), that means a physical page has been assigned to the virtual page, and write data from a host 2 has been stored in the physical page. On the other hand, if the page type (305) is 1, and both page # (306) and pool # (307) are null, that means a write request to the virtual page has not yet issued from a host 2, and no physical page has been assigned.

The number of metadata reduction chunks (308) is information related to a deduplication process, and its details will be described later.

Incidentally, since the virtual volume management table 300 is created with respect to each virtual volume, if multiple virtual volumes exist, multiple virtual volume management tables 300 exist. Furthermore, in a case where multiple virtual volumes exist, in each record of the virtual volume management tables 300, information for identifying a virtual volume (for example, a virtual volume number) can be included in addition to the above-described information such as virtual page # (301).

FIG. 7 shows an example of the append write space mapping table 350. The append write space mapping table 350 is management information for managing a physical page mapped to an append write space. Since an append write space is provided with respect to each pool, the append write space mapping table 350 also exists with respect to each pool. In append write page # (351) of each line, an append write page number is stored in ascending order. Each record of the append write space mapping table 350 indicates that a page identified by page # (352) and pool # (353) has been assigned to an append write page identified by append write page # (351). If a page has not been assigned to an append write page, null is stored in both page # (352) and pool # (353) of the append write page.

The in-page last write position (354) stores therein a relative address of a block where a compressed chunk has been written last in blocks in an append write page. Specifically, the relative address is an address of the block when the first block in a page has been set to 0. In an example of FIG. 7, the in-page last write position (354) of a record with append write page # (351) of "2" is "0x05", which indicates that compressed chunks have been written from the page top to the sixth block in a page assigned to an append write page with append write page # "2". When the storage apparatus 1 appends a compressed chunk to an append write space, the storage apparatus 1 identifies a position in which the compressed chunk is to be written by reference to the in-page last write position (354) and the last write position (604) of the pool management information 600.

Subsequently, the logical-physical conversion table 500 is described. The logical-physical conversion table 500 is a table for managing the move destination of each chunk when the chunk on an overwrite space has been compressed and moved to an append write space. FIG. 8 shows an example of the logical-physical conversion table 500. The logical-physical conversion table 500 may also be written as the LP conversion table 500.

A record of the LP conversion table 500 shows information about a correspondence relation (mapping) between a chunk on a virtual volume and the record position of a compressed chunk. Each record indicates that the length starting from an address identified by a PA (503) after a region (a chunk) of 8 KB identified by an LA (501) of the record was compressed has been stored in an area of Length (504). After description of the outline of a deduplication process, FPK upper 32 bits (502) and FPMQ entry (505) will be described.

As described above, the storage apparatus 1 according to the present embodiment performs a deduplication process; therefore, in principle, multiple chunks with the same content are controlled not to be stored in an append write space. With FIG. 2 again, the outline of the deduplication process is described. Assume that, in a state where chunks A and B in VP #2 of a virtual volume have been stored as compressed chunks a and b on the append write space respectively, the storage apparatus 1 starts a process of moving a chunk in VP #3 to the append write space. If chunk D has the same content as chunk B, a compressed chunk of chunk D is not written in the append write space. Instead, the storage apparatus 1 stores the same value as a PA (503) of a record where information of chunk B has been stored in the LP conversion table 500 in a PA (503) of a record where information of chunk D has been stored in the LP conversion table 500.

Furthermore, when the storage apparatus 1 performs a deduplication process, the storage apparatus 1 performs a predetermined operation (such as an operation using a hash function) on a chunk, thereby generating a value. In the present embodiment, this generated value is referred to as an FPK (FingerPrint Key). In the present embodiment, the FPK is information of a size of 64 bits. However, the size of the FPK can be a size other than 64 bits.

Figure 9:
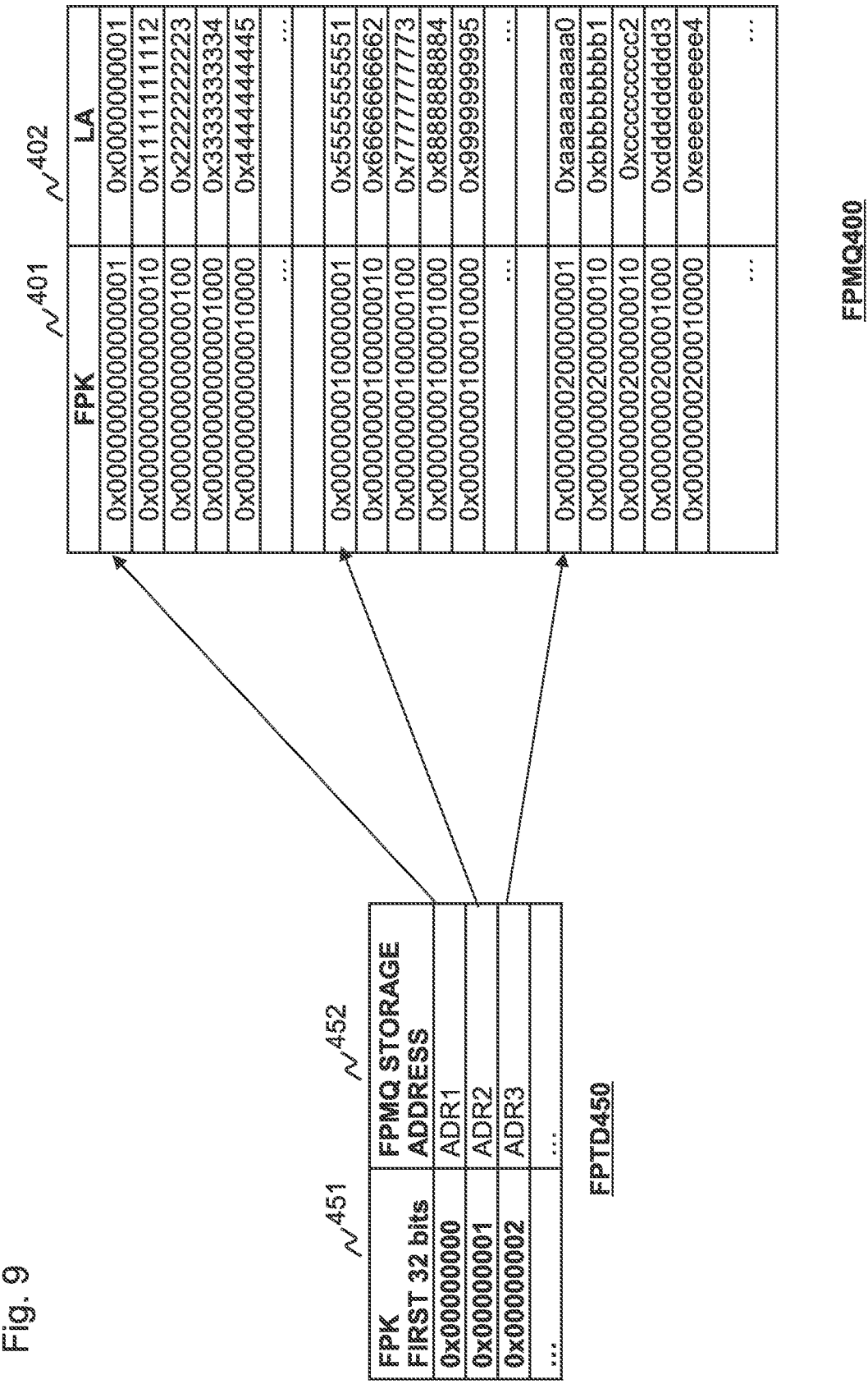
FIG. 9 is configuration examples of a FingerPrint Match Queue and a FingerPrint Table Directory.

The storage apparatus 1 records a correspondence relation between an FPK generated from a chunk and an LA of the chunk in management information. This management information is referred to as a FingerPrint Match Queue (hereinafter, referred to as "FPMQ"). FIG. 9 shows an example of the FPMQ 400. The FPMQ 400 is a table including columns of FPK (401) and LA (402); an FPK generated from a region (a chunk) of 8 KB starting from an LA (402) is stored in FPK (401). Lines (records) stored in the FPMQ 400 are sorted in ascending order of FPK (401). In the following, a record of the FPMQ 400, i.e., a set of an FPK (401) and an LA (402) may be referred to as "metadata of a chunk" (or simply "metadata").

The FPMQ 400 is provided with respect to each pool. For example, when the storage apparatus 1 moves a chunk of a virtual volume (an overwrite space) belonging to pool # n to an append write space (this chunk is referred to as "chunk A" temporarily), the storage apparatus 1 determines whether the same chunk (compressed chunk) as chunk A already exists in the append write space by reference to the FPMQ 400 for pool # n. If the same FPK as that of chunk A does not exist in the FPMQ 400 for pool # n, it can be determined that the same chunk (compressed chunk) as chunk A does not exist in the append write space for pool # n. In the storage apparatus 1 according to the present embodiment, the range of deduplication is a pool. Therefore, if the same chunk (compressed chunk) as chunk A does not exist in a pool with pool # n but exists in a pool other than the pool with pool # n, (the compressed chunk of) chunk A is written in the pool with pool # n.

Furthermore, to make it possible to perform the search for information in the FPMQ 400 efficiently, the storage apparatus 1 includes management information in which an address (an address on the cache memory 14) where some records have been stored in the FPMQ 400 is recorded. This management information is referred to as a FingerPrint Table Directory. Furthermore, in the following, this may also be referred to an "FPTD".

FIG. 9 shows an example of the FPTD 450. Just like the FPMQ 400, the FPTD 450 is also provided with respect to each pool. In FPMQ storage address (452), an address (an address on the cache memory 14) of a record with the smallest FPK 401 in records whose upper 32 bits of an FPK stored in FPK 401 is equal to FPK upper 32 bits (451) among records of the FPMQ 400 is stored.

For example, assume that an FPK 401 of a record with the smallest value of FPK 401 in records whose upper 32 bits of an FPK 401 is "0x00000001" in the FPMQ 400 is "0x0000000100000001". If an address where the record with an FPK 401 of "0x0000000100000001" has been stored is "ADR 2" at this time, a record of which the FPK upper 32 bits (451) is "0x00000001" and the FPMQ storage address 452 is "ADR 2" is recorded in the FPTD 450.

In a deduplication program 1000 to be described later, there is performed a process of calculating an FPK of a chunk and then determining whether the same value as the FPK has been stored in FPK (401) of the FPMQ 400. If the number of records that have been stored in the FPMQ 400 is very large, it takes a time to search; therefore, the FPTD 450 is used.

For example, in a case of searching a record in which "0x0000000100000001" has been stored, the deduplication program 1000 identifies the FPMQ storage address (452) corresponding to an FPK upper 32 bits (451) of "0x00000001" as "ADR 2" by reference to the FPTD 450. Then, the deduplication program 1000 searches, of records in the FPMQ 400, in order from records with an address of "ADR 2" (this is an address on the cache memory 14) for a record in which "0x0000000100000001" has been stored. Incidentally, the FPTD 450 is information for improving the speed to search the FPMQ 400 for information, thus the FPTD 450 is not essential information.

The FPMQ 400 stores therein metadata of a chunk with respect to each chunk. If there are many chunks with an FPK generated, the size of the FPMQ 400 increases and consumes the storage region of the cache memory 14 more. To avoid excess consumption of the storage region of the cache memory 14, the storage apparatus 1 according to the present embodiment performs the control of not storing metadata of a chunk which meets a predetermined condition in the FPMQ 400. Details of this control will be described later.

FPK upper 32 bits (502) and FPMQ entry (505) in FIG. 8 are described. In FPK upper 32 bits (502) of the LP conversion table 500, upper 32 bits of an FPK of a chunk is stored. FPMQ entry (505) is information indicating whether or not metadata of a chunk has been entered in the FPMQ 400. If the storage apparatus 1 has entered metadata of a chunk identified by an LA (501) in the FPMQ 400, "1" is recorded in FPMQ entry (505); if not, "0" is recorded in FPMQ entry (505). Furthermore, after an FPK generated from a chunk (and an LA of the chunk) has been entered in the FPMQ 400, the FPK and the LA of the chunk may be deleted from the FPMQ 400. Also, in that case, the storage apparatus 1 records "0" in FPMQ entry (505).

The storage apparatus 1 counts, with respect to each pool, the number of entries or deletions of metadata of a chunk in/from the FPMQ 400 and stores the count number in the pool management information 600. With reference to FIG. 5 again, the number of cumulative deduplication target chunks (602) and the number of metadata deletion chunks (603) in the pool management information 600 are described.

In the number of cumulative deduplication target chunks (602), the number of entries of metadata of a chunk (an LA and an FPK of a chunk) in the FPMQ 400 is recorded. Furthermore, in the number of metadata deletion chunks (603), the number of deletions (or no entries made) of metadata of a chunk from the FPMQ 400 is recorded. Incidentally, the storage apparatus 1 manages these numbers with respect to each pool. Therefore, when metadata of a chunk in a pool with pool number n has been entered in the FPMQ 400, the storage apparatus 1 increments the number of cumulative deduplication target chunks (602) of a line (a record) with pool number (601) n by one. Furthermore, when metadata of a chunk in a pool with pool number n has been deleted from the FPMQ 400, the storage apparatus 1 decrements the number of metadata deletion chunks (603) of a line (a record) with pool number (601) n by one.

(4) Flow of Process

Figure 10:
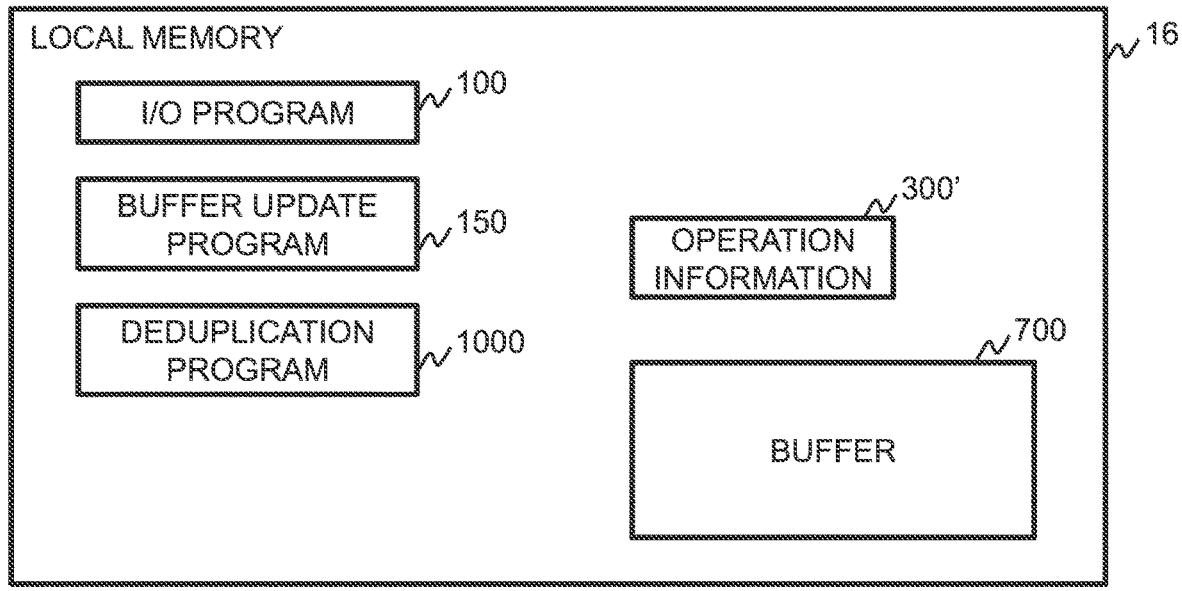
FIG. 10 is a list of programs that the storage apparatus includes.

Subsequently, the flow of a process performed by the storage apparatus 1 according to the present embodiment is described. As shown in FIG. 10, in the local memory 16 of the storage apparatus 1 according to the present embodiment, at least, an I/O program 100, a buffer update program 150, and the deduplication program 1000 have been stored; the CPU 11 executes these programs. Furthermore, the local memory 16 is provided with operation information 300' and a buffer 700. The buffer 700 is a memory region used when the CPU 11 performs a compression process or a decompression process.

The operation information 300' is information in which, of the pieces of information stored in the virtual volume management table 300, some of the information have been stored. Specifically, the operation information 300' includes, of the records of the virtual volume management table 300, virtual page # (301), the number of sequential WRs (302), the number of random WRs (303), and the last update time (304) only. Therefore, the illustration of the operation information 300' is omitted in the present specification.

First, the flow of a process executed by the I/O program 100 is described. Incidentally, in the flowcharts described below, "S" in the alphabet added at the head of a reference numeral denotes "Step".

Figure 11:
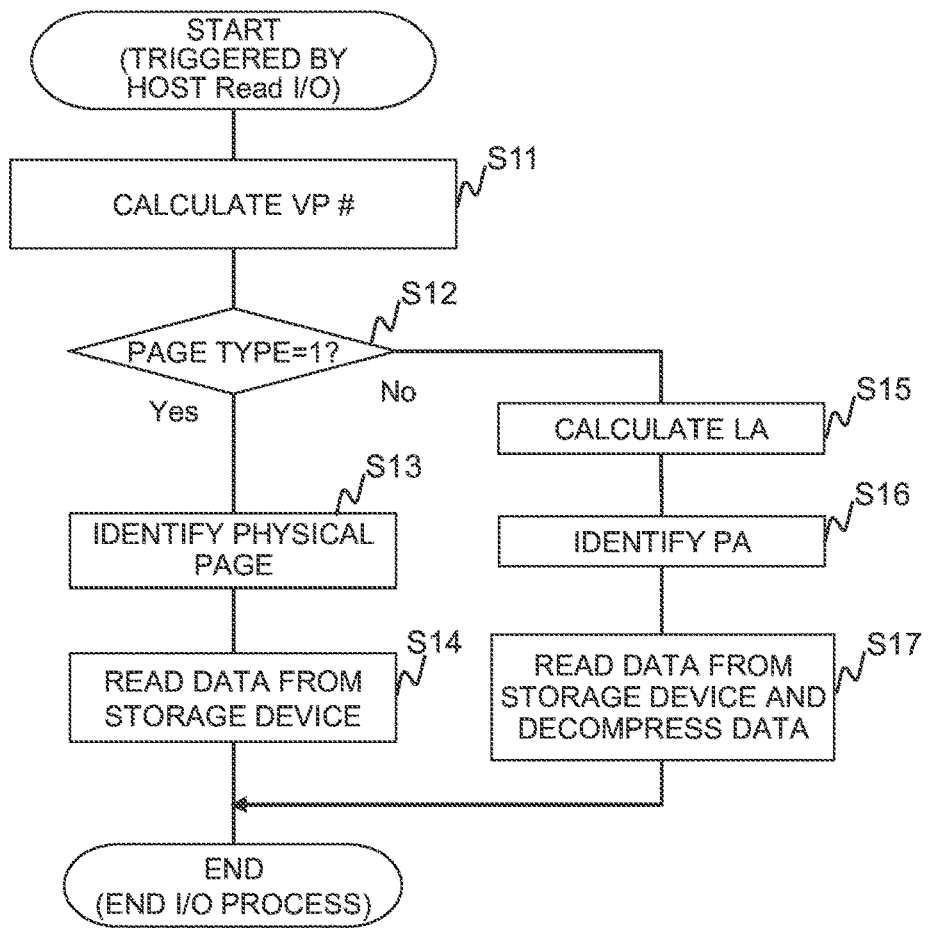
FIG. 11 is a flowchart of a read process.

When the storage apparatus 1 has received an I/O request from a host 2, execution of the I/O program 100 starts. In FIG. 11, the flow of a process performed by the I/O program 100 when the storage apparatus 1 has received a read request from a host 2 is described. Incidentally, FIG. 11 provides an example where data in a region specified in the read request does not exist in the cache memory 14 (a case of a cache miss).

Step 11: When having received a read request from a host 2, the I/O program 100 converts an address (an LBA) of a read destination included in the read request into a virtual page number. In the following, there is described an example of a case where a virtual page number of a read destination region is p. Furthermore, in the following, there is described an example of a case where the read destination region specified in the read request does not extend to multiple virtual pages.

Step 12: By reference to the virtual volume management table 300, the I/O program 100 determines whether the page type (305) of the virtual page number (p) obtained at Step 11 is "1". If the page type (305) is "1" (Step 12: Yes), Step 13 is performed next; if not (Step 12: No), Step 15 is performed next.

Step 13: By reference to the virtual volume management table 300, the I/O program 100 identifies a page number (306) of a physical page assigned to a virtual page (VP # p). Furthermore, by reference to the page management table 200, the I/O program 100 identifies DEV # (202) and Addr (203) of a storage device 20 in which the physical page exists.

Step 14: The I/O program 100 reads data from the storage device 20 identified at Step 13, and sends the read data back to the host 2, and then ends the process. Incidentally, the data read here can be stored in the cache memory 14. Having done that, when the I/O program 100 again receives a read request to the data later, the I/O program 100 can return the data to a host 2 without accessing the storage device 20.

Step 15: In a case where Step 15 is performed, since the data in the region specified in the read request has been moved to an append write space, the I/O program 100 needs to calculate an address (a PA) on the append write space where the data to be read (a compressed chunk) has been stored. Incidentally, in the following, there is described an example of a case where the size of the region specified in the read request is equal to one chunk (8 KB), and this region coincides with the bounds of the chunk. At Step 15, the I/O program 100 converts an address (an LBA) of a read destination included in the read request into an LA.

Step 16: By reference to the LP conversion table 500, the I/O program 100 identifies a record with an LA (501) equal to the LA identified at Step 15, and identifies a PA (503) and Length (504) of the record. Furthermore, the I/O program 100 calculates an append write page number from the identified PA, and identifies page # (352) and pool # (353) of a physical page assigned to an append write page identified by reference to the append write space mapping table 350. Moreover, the I/O program 100 identifies DEV # (202) and Addr (203) of a storage device 20 in which the physical page exists by reference to the page management table 200.

Step 17: The I/O program 100 reads data (a compressed chunk) from the storage device 20 identified at Step 16, and stores the compressed chunk in the buffer 700. Furthermore, the I/O program 100 decompresses the compressed chunk stored in the buffer 700. Then, the I/O program 100 returns the decompressed data to the host 2, and ends the process. Incidentally, the data read here can be stored in the cache memory 14.

Figure 12:
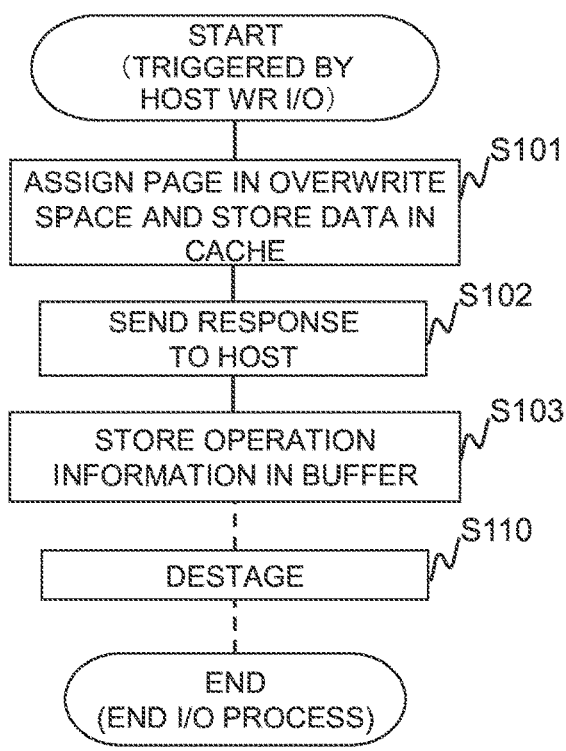
FIG. 12 is a flowchart of a write process.

In FIG. 12, the flow of a process performed by the I/O program 100 when a write request has been issued from a host 2 is described.

Step 101: When having received a write request from a host 2, the I/O program 100 reserves a region on the cache memory 14 to receive data to be written in the write request. Then, the I/O program 100 stores the data to be written in the reserved region. Since this is a process performed in a publicly known storage apparatus as well, detailed description is omitted. Incidentally, at Step 101, the I/O program 100 converts an address (an LBA) of the write destination region specified in the write request into a virtual page #. In the following, there is described an example of a case where a virtual page number of the write destination region is p.

Step 102: The I/O program 100 gives the host 2 a response regarding the completion of a write process.

Step 103: The I/O program 100 stores the current time (the time at which Step 103 is performed) in the last update time (304) of a record of virtual page # p (301) in records of the operation information 300'. Furthermore, the I/O program 100 determines whether the write request received this time is a sequential write request or a random write request. If the write request received this time is a sequential write request, the I/O program 100 increments the number of sequential WRs (302) of the record of virtual page # p (301) in the operation information 300' by one. If the write request received this time is a random write request, the I/O program 100 increments the number of random WRs (303) of the record of virtual page # p (301) in the operation information 300' by one.

After Step 103, in the event of a predetermined trigger, the I/O program 100 writes data stored in the cache memory 14 in a storage device 20 (Step 110). This process is referred to as destage. When data written in a virtual page (assuming this as VP # p) is destaged, if a physical page has been assigned to the virtual page, the data is destaged to a storage device 20 in which the assigned physical page exists. Furthermore, if a physical page has not been assigned, a physical page is assigned to the virtual page before destage. Moreover, if a chunk of VP # p has been moved to an append write space, the I/O program 100 appends the data to the append write space. Details of this process will be described later.

Furthermore, Step 110 does not have to be performed just after Step 103, and can be performed at any time. For example, when the load on the CPU 11 of the storage apparatus 1 is low, or when the amount of data stored in the cache memory 14 becomes more than a predetermined threshold, Step 110 can be performed.

Information recorded in the operation information 300' at Step 103 is reflected in the virtual volume management table 300 on the cache memory 14 by the buffer update program 150. The buffer update program 150 is a program performed regularly.

Figure 13:
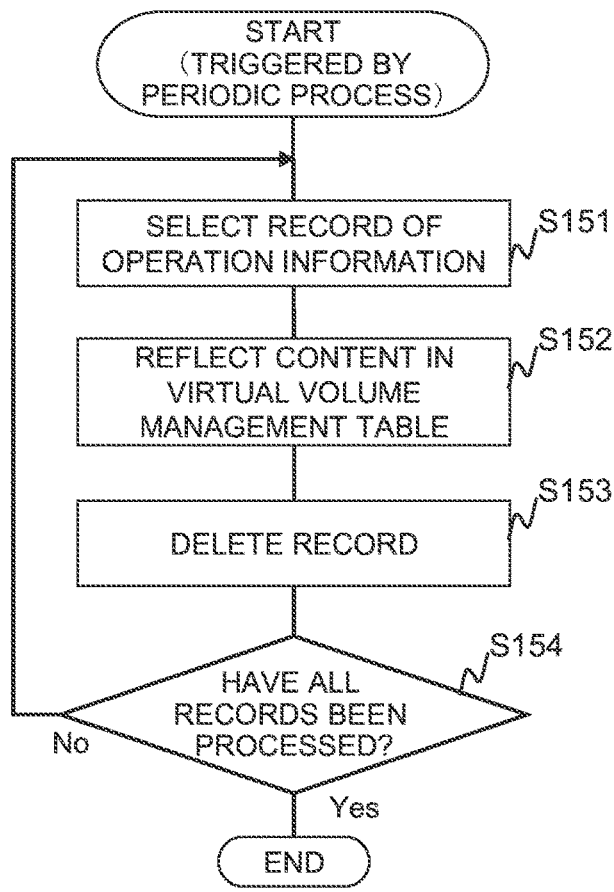
FIG. 13 is a flowchart of a buffer update program.

When execution of the buffer update program 150 starts, the buffer update program 150 reflects the content of the operation information 300' in the virtual volume management table 300. The flow of this process is described with FIG. 13.

Step 151: The buffer update program 150 selects one of the records of the operation information 300'. In the following, there is described an example of a case where virtual page # (101) of this record is p.

Step 152: The buffer update program 150 adds the values of the number of sequential WRs (302) and the number of random WRs (303) of the record of the operation information 300' selected at Step 151 to the number of sequential WRs (302) and the number of random WRs (303) of a record of virtual page # p (101) in the records of the virtual volume management table 300, respectively. Furthermore, the last update time (304) of the selected record of the operation information 300' is recorded in the last update time (304) of the record of virtual page # p (101).

Step 153: The buffer update program 150 deletes the record of the operation information 300' selected at Step 151 from the local memory 16.

Step 154: When the processes up to Step 153 have been performed on all the records of the operation information 300' (Step 154: Yes), the process ends. If there still remains a record of the operation information 300' in the local memory 16 (Step 154: No), the buffer update program 150 repeats the process from Step 151.

In the storage apparatus 1 according to the present embodiment, when the CPU 11 accesses the cache memory 14, the CPU 11 accesses the cache memory 14 through the internal switch 17; therefore, the access performance is not better (the response time becomes longer) than the performance when the CPU 11 accesses the local memory 16. Therefore, the storage apparatus 1 according to the present embodiment performs the control of temporarily recording information of the number of sequential WRs (302), the number of random WRs (303), and the last update time (304) in the operation information 300' on the local memory 16 and regularly reflecting the content of the information in the virtual volume management table 300 on the cache memory 14.

However, as another practical example, in a case where the storage apparatus 1 includes only the local memory 16 and the virtual volume management table 300 is configured to be stored on the local memory 16, it is not necessary to perform such control, and the I/O program 100 can directly update the number of sequential WRs (302), the number of random WRs (303), and the last update time (304) in the virtual volume management table 300 at Step 103. Furthermore, also in a case where the storage apparatus 1 includes only the cache memory 14 and all information is configured to be stored on the cache memory 14, it is not necessary to perform the above-described control, and the I/O program 100 can update the virtual volume management table 300 on the cache memory 14 at Step 103.

Figure 14:
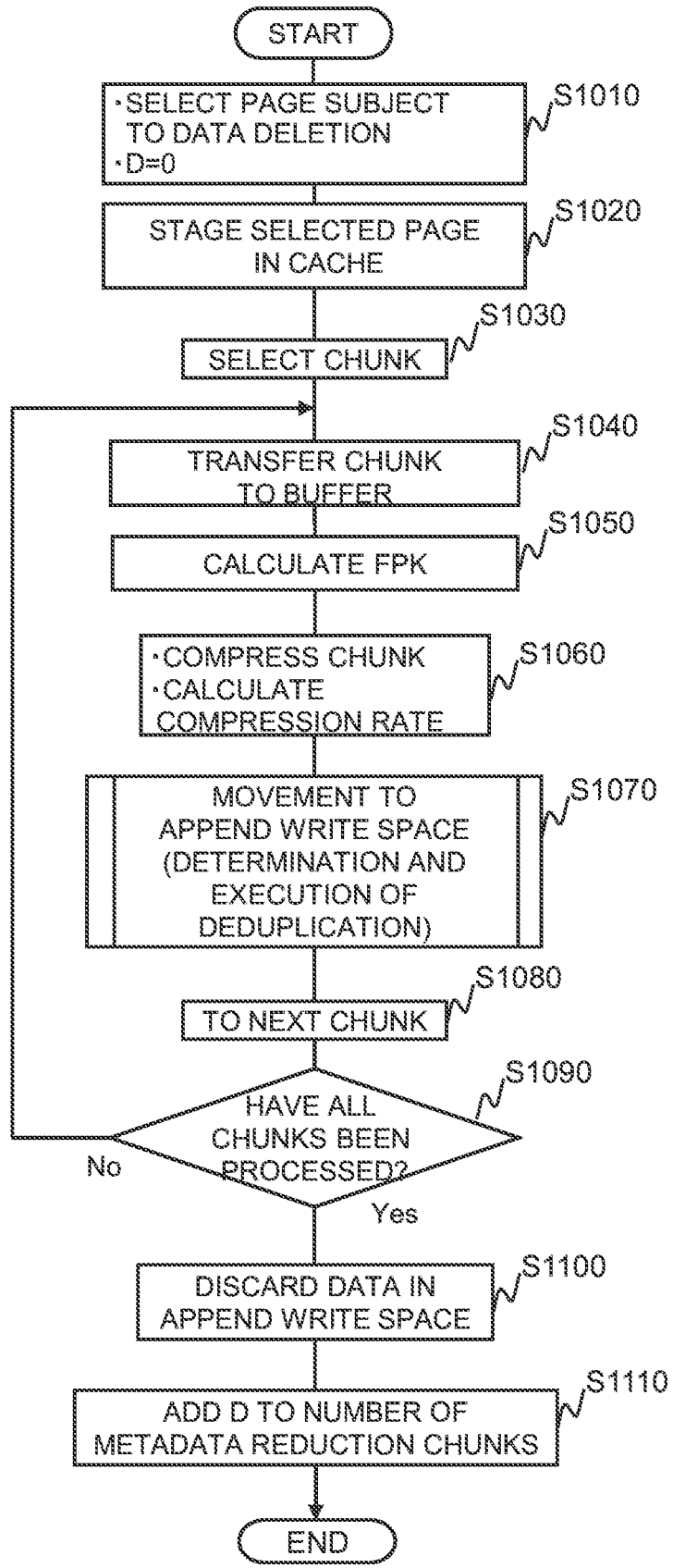
FIG. 14 is a flowchart (1) of a deduplication program.
Figure 15:
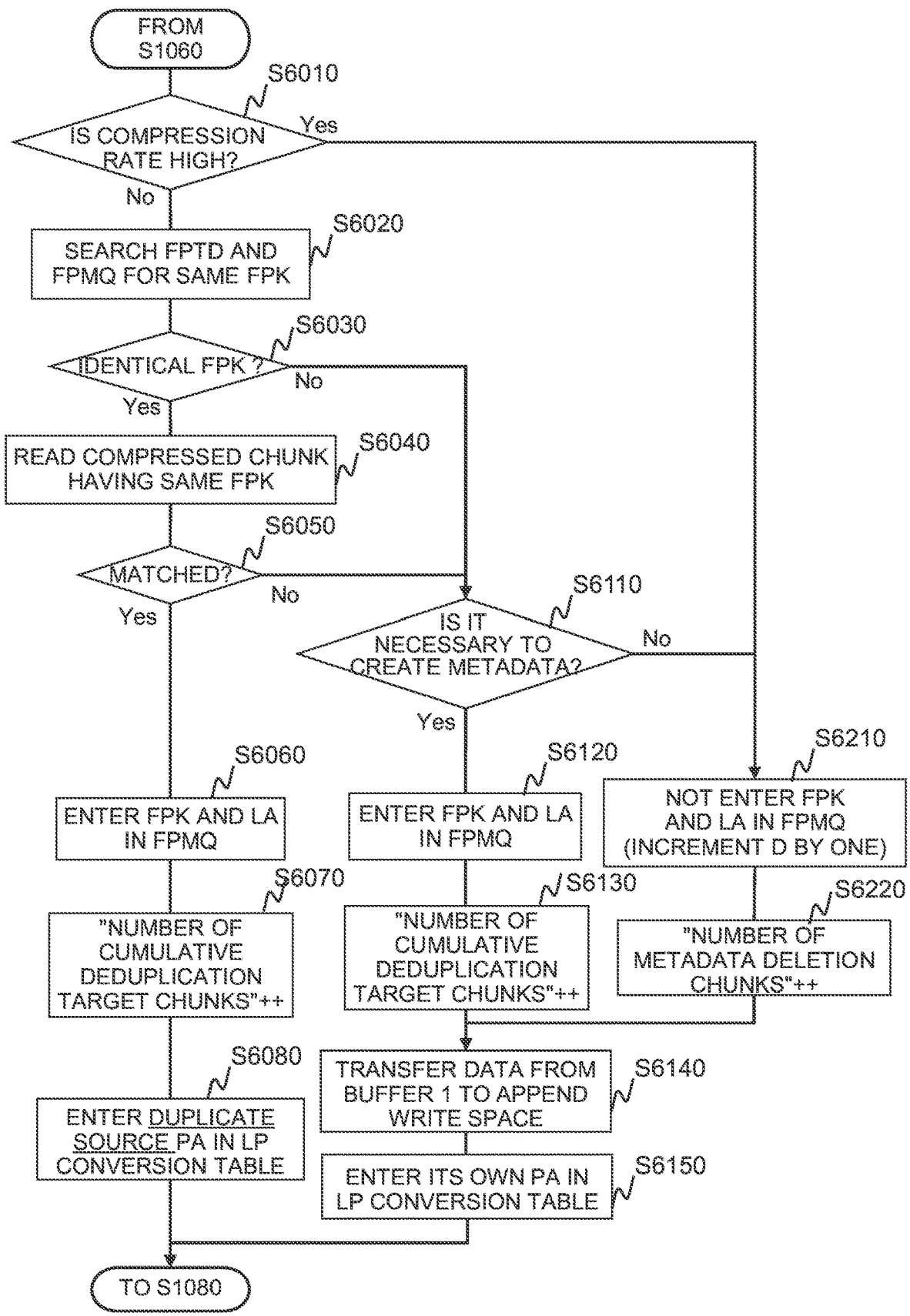
FIG. 15 is a flowchart (2) of the deduplication program.

Subsequently, a process of the deduplication program 1000 is described with FIGS. 14 and 15. The deduplication program 1000 is a program that performs a process of moving data written in an overwrite space from a host 2 (this data is stored in a physical page assigned to the overwrite space temporarily) to a page assigned to an append write space. As described above, when the data (a chunk) is moved to the page assigned to the append write space, the chunk is compressed. Then, the deduplication process may be performed.

Step 1010: The deduplication program 1000 selects a virtual page that data is to be moved to an append write space thereof by reference to the virtual volume management table 300. The criteria of the selection of a virtual page can be arbitrary. As an example, of virtual pages whose page type (305) is "1", one that the difference between the current time and the last update time (304) is equal to or more than a predetermined threshold and has the last update time (304) that is oldest can be selected. Since data (a chunk) stored in an append write space has been compressed, the response time when accessing becomes longer. Therefore, it is preferable to put infrequently accessed data rather than frequently accessed data in an append write space. Furthermore, the deduplication program 1000 prepares a variable D, and initializes D (substitutes 0 for D).

Step 1020: The deduplication program 1000 reads data of the virtual page selected at Step 1010 from a storage device 20 onto the cache memory 14. If the data of the virtual page already exists on the cache memory 14, this Step 1020 does not have to be performed.

Step 1030: The deduplication program 1000 selects a chunk from the data read onto the cache memory 14 at Step 1020. The method of selecting a chunk is arbitrary. For example, a chunk can be selected in ascending order of LA.

Step 1040: The deduplication program 1000 transfers the chunk selected at Step 1030 (or Step 1080 to be described later) to the buffer 700.

Step 1050: The deduplication program 1000 calculates an FPK from the data transferred to the buffer 700.

Step 1060: The deduplication program 1000 compresses the data transferred to the buffer 700, thereby generating a compressed chunk. At the same time, the deduplication program 1000 finds a compression rate of this chunk. The definition of the compression rate is as described above. The compressed chunk generated here is saved in the buffer 700 temporarily.

Step 1070: At this step, the deduplication program 1000 stores the compressed chunk in the append write space. Furthermore, a deduplication process is also performed as needed. Details of this process will be described later.

Step 1080: The deduplication program 1000 selects the next chunk (a chunk that has not yet been subjected to the process at Step 1070) from the data read onto the cache memory 14 at Step 1020.

Step 1090: If the next chunk is not able to be selected at Step 1080, i.e., if the process at Step 1070 has been performed on all the chunks (Step 1090: Yes), Step 1100 is performed next. If the next chunk is able to be selected at Step 1080 (Step 1090: No), the deduplication program 1000 again performs the process from Step 1040.

Step 1100: The deduplication program 1000 discards the data on the overwrite space. Specifically, the deduplication program 1000 updates the content of the virtual volume management table 300 so that the page assigned to the virtual page selected at Step 1010 becomes to be in a state of not being assigned to the virtual page ("0" is stored in the page type (305) of this virtual page, and "null" is stored in both page # (306) and pool # (307)). Furthermore, to put the assigned physical page into an unused state, the deduplication program 1000 updates, of the record of the page management table 200 for this physical page, the value of use (204) of the assigned physical page to "0".

Step 1110: At Step 1070, in principle, the deduplication program 1000 enters metadata of the chunk in the FPMQ 400. However, if the chunk meets a predetermined condition, the metadata of the chunk is not entered in the FPMQ 400. The deduplication program 1000 holds the number of chunks of which the metadata has not been entered in the FPMQ 400 in the variable D. At Step 1110, the deduplication program 1000 adds the value of D to the number of metadata reduction chunks (308) in the virtual volume management table 300, and ends the process.

Subsequently, details of the process performed at Step 1070 are described with reference to FIG. 15.

Step 6010: The deduplication program 1000 determines whether or not the compression rate found at Step 1060 is greater than a predetermined threshold. If the compression rate is equal to or less than the predetermined threshold (Step 6010: No), Step 6020 is performed next. If the compression rate is greater than the predetermined threshold, Step 6210 is performed next.

Step 6020: The deduplication program 1000 searches the FPMQ 400 to see if the same FPK as the FPK found at Step 1050 has been stored in the FPMQ 400. As described above, the deduplication program 1000 searches for a record of the FPMQ 400 in which the same FPK as the FPK found at Step 1050 has been stored by reference to the FPTD 450 and the FPMQ 400.

Step 6030: If the same FPK as the FPK found at Step 1050 has been stored in the FPMQ 400 (Step 6030: Yes), the deduplication program 1000 performs Step 6040 next. If the same FPK as the FPK found at Step 1050 has not been stored in the FPMQ 400 (Step 6030: No), Step 6110 is performed next.

Step 6040: By reference to the FPMQ 400, the LP conversion table 500, the append write space mapping table 350, and the page management table 200, the deduplication program 1000 reads a chunk (a compressed chunk) having the same FPK as the FPK found at Step 1050 from a storage device 20.

Specifically, first, by reference to the FPMQ 400 and the LP conversion table 500, the deduplication program 1000 identifies a PA in which a chunk (a compressed chunk) having the same FPK as the FPK found at Step 1050 has been stored and the length of the PA. Hereinafter, this chunk is referred to as the "duplicate candidate chunk", and the PA of the duplicate candidate chunk is referred to as "PA1". Then, by reference to the append write space mapping table 350, the deduplication program 1000 identifies a page number of a page (a physical page) in which the duplicate candidate chunk has been stored, and further, by reference to the page management table 200, identifies a storage device and an address where the page in which the duplicate candidate chunk has been stored exists. This is a process similar to Step 16 that the I/O program 100 performs. Then, the deduplication program 1000 reads the duplicate candidate chunk from the identified storage device 20.

Step 6050: The deduplication program 1000 compares the chunk (compressed chunk) read at Step 6040 with the chunk compressed at Step 1050 to determine whether or not the two are identical. Although they both are in a compressed state in the comparison, the deduplication program 1000 compares the compressed chunks with respect to each byte. However, as another practical example, the deduplication program 1000 can decompress the compressed chunks temporarily and compare the decompressed data. As a result of the comparison, if the two are matched (Step 6050: Yes), Step 6060 is performed next. If the two are different (Step 6050: No), Step 6110 is performed next.

Step 6060: The deduplication program 1000 enters the FPK of the chunk and the LA of the chunk in the FPMQ 400. Furthermore, the deduplication program 1000 stores "1" in FPMQ entry (505) of a record with an LA (501) coincident with an LA of a chunk to be processed in the records of the LP conversion table 500.

Step 6070: The deduplication program 1000 increments the number of cumulative deduplication target chunks (602) in the pool management information 600 by one.

Step 6080: The deduplication program 1000 stores the PA (i.e., PA1) of the duplicate candidate chunk in the PA (503) of a record with an LA (501) coincident with an LA of a chunk to be processed in the records of the LP conversion table 500, and stores the length of the duplicate candidate chunk in Length (504). In this case, the storage of a compressed chunk in an append write space is not performed. After that, the deduplication program 1000 performs the processes at Steps 1080 and onward.

Step 6110: This step is performed if the determination at Step 6030 is negative or if the determination at Step 6050 is negative, i.e., if the same chunk as the chunk to be processed has not been stored in the append write space. At Step 6110, the deduplication program 1000 determines whether or not to enter metadata of the chunk in the FPMQ 400.

Specifically, if the total size of the FPMQ 400 is more than a predetermined specified value, and if the random write rate of the virtual page to which the chunk to be processed belongs is equal to or more than a predetermined value (Step 6110: No), the deduplication program 1000 determines not to enter metadata of the chunk in the FPMQ 400, and Step 6210 is performed next. On the other hand, if the total size of the FPMQ 400 is not more than the predetermined specified value, or if the random write rate of the virtual page to which the chunk to be processed belongs is less than the predetermined value (Step 6110: Yes), the deduplication program 1000 determines to enter metadata of the chunk in the FPMQ 400, and Step 6120 is performed next.

Incidentally, the "predetermined specified value" here can be set on the basis of the capacity of the cache memory 14. For example, if the total size of the FPMQ 400 is more than x % of the capacity of the cache memory 14 (and if the random write rate of the virtual page is equal to or more than the predetermined value), it can be determined not to enter the metadata of the chunk in the FPMQ 400. If the total size of the FPMQ 400 increases excessively, and the consumption of the cache memory 14 increases, thereby the amount of write data, etc. from the hosts 2 that the cache memory 14 can store is reduced, which adversely affects the performance of the storage apparatus 1.

Furthermore, the random write rate here is a value calculated by using the number of random WRs (303) and the number of sequential WRs (302) that have been stored in the virtual volume management table 300. The random write rate can be found by the following formula:

$$r \div (r+s)$$

where r denotes the number of random WRs (303) of a virtual page to which a chunk to be processed belongs, s denotes the number of sequential WRs (302).

Step 6120, Step 6130: These steps are equal to Step 6060 and Step 6070.

Figure 16:
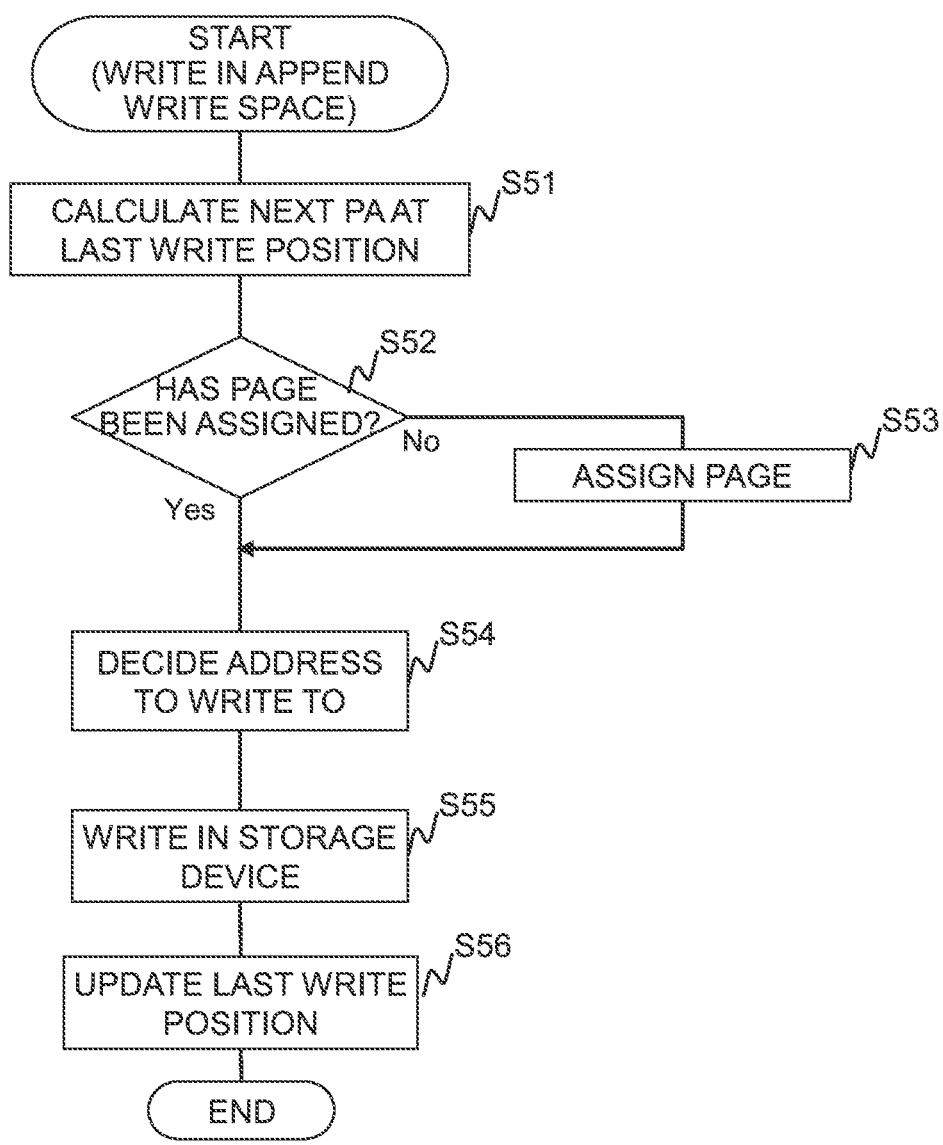
FIG. 16 is a flowchart (1) of a process of append write in an append write space.

Step 6140: The deduplication program 1000 writes the compressed chunk temporarily saved in the buffer 700 in the append write space, and deletes the compressed chunk in the buffer 700. As described above, when the deduplication program 1000 writes a compressed chunk in an append write space, the deduplication program 1000 appends the compressed chunk to the append write space. Here, the flow of a process of appending a compressed chunk to an append write space is described with FIG. 16.

First, the deduplication program 1000 determines an address (a PA) on an append write space in which a compressed chunk is to be appended (Step 51). The storage apparatus 1 holds information of the last write position in the append write space in the pool management information 600 and the append write space mapping table 350. The deduplication program 1000 identifies an append write page # of an append write page in which write has been performed last by reference to the last write position (604) in the pool management information 600. Hereinafter, this append write page # is referred to as AP1. Then, the deduplication program 1000 identifies the in-page last write position (354) of a record of which the append write page # (351) is AP1 by reference to the append write space mapping table 350. Hereinafter, this in-page last write position (354) is referred to as RA1. Then, the deduplication program 1000 calculates "AP1×page size (42 MB)+512+RA1+1", thereby finding an address (a PA) on the append write space in which the compressed chunk is to be written. In the following, there is described an example of a case where a PA of a compressed chunk write destination is determined to be "PA2", and the length of the compressed chunk is "L2".

Then, the deduplication program 1000 determines whether a physical page has been assigned to an append write page including the PA (PA2) determined at Step 51 (Step 52). For this, the deduplication program 1000 divides PA2 by the page size (42 MB), thereby finding append write page # of the append write page including PA2 (hereinafter, the obtained append write page # is referred to as "AP2").

Furthermore, the deduplication program 1000 determines whether a valid value (a value other than null) has been stored in page # (352) of a record of which the append write page # (351) is AP2 by reference to the append write space mapping table 350. If a valid value has been stored in page # (352), a physical page has been assigned to the append write page including PA2.

If a physical page has not been assigned to the append write page including PA2 (Step 52: No), the deduplication program 1000 assigns a physical page to the append write page (Step 53). Specifically, the deduplication program 1000 selects one of unused physical pages from the page management table 200, and stores page # of the page and pool # of a pool to which the page belongs in page # (352) and pool # (353) of the record of which the append write page # (351) is AP2, respectively. Furthermore, the deduplication program 1000 stores "1" in use (204) of the physical page selected from the page management table 200. On the other hand, if a physical page has been assigned to PA2 (Step 52: Yes), Step 53 is not performed.

At Step 54, the deduplication program 1000 calculates an address of a storage device 20 that is a destination to write the compressed chunk by reference to the append write space mapping table 350 and the page management table 200. Then, the deduplication program 1000 writes the compressed chunk in the address calculated at Step 54 (Step 55). At Step 56, the deduplication program 1000 substitutes append write page # of the append write page in which the compressed chunk has been written this time for the last write position (604) in the pool management information 600, and substitutes a relative address in the append write page where write has been performed last for the last write position (604), and then ends the process.

The above is the process performed at Step 6140. Return to description of FIG. 15 again.

Step 6150: The deduplication program 1000 stores the PA (i.e., PA2) of the compressed chunk in PA (503) of a record with an LA (501) coincident with an LA of a chunk to be processed in the records of the LP conversion table 500, and stores the length (L2) of the compressed chunk in Length (504). After that, the deduplication program 1000 performs the processes at Steps 1080 and onward.

Step 6210: The deduplication program 1000 increments the variable D by one. Furthermore, when Step 6210 is performed, the deduplication program 1000 does not perform the deduplication determination of the chunk (compressed chunk) to be processed in the process of FIG. 15, and does not enter metadata of the chunk in the FPMQ 400.

Step 6220: The deduplication program 1000 increments the number of metadata deletion chunks (603) in the pool management information 600 by one. After that, the deduplication program 1000 performs Step 6140.

Figure 17:
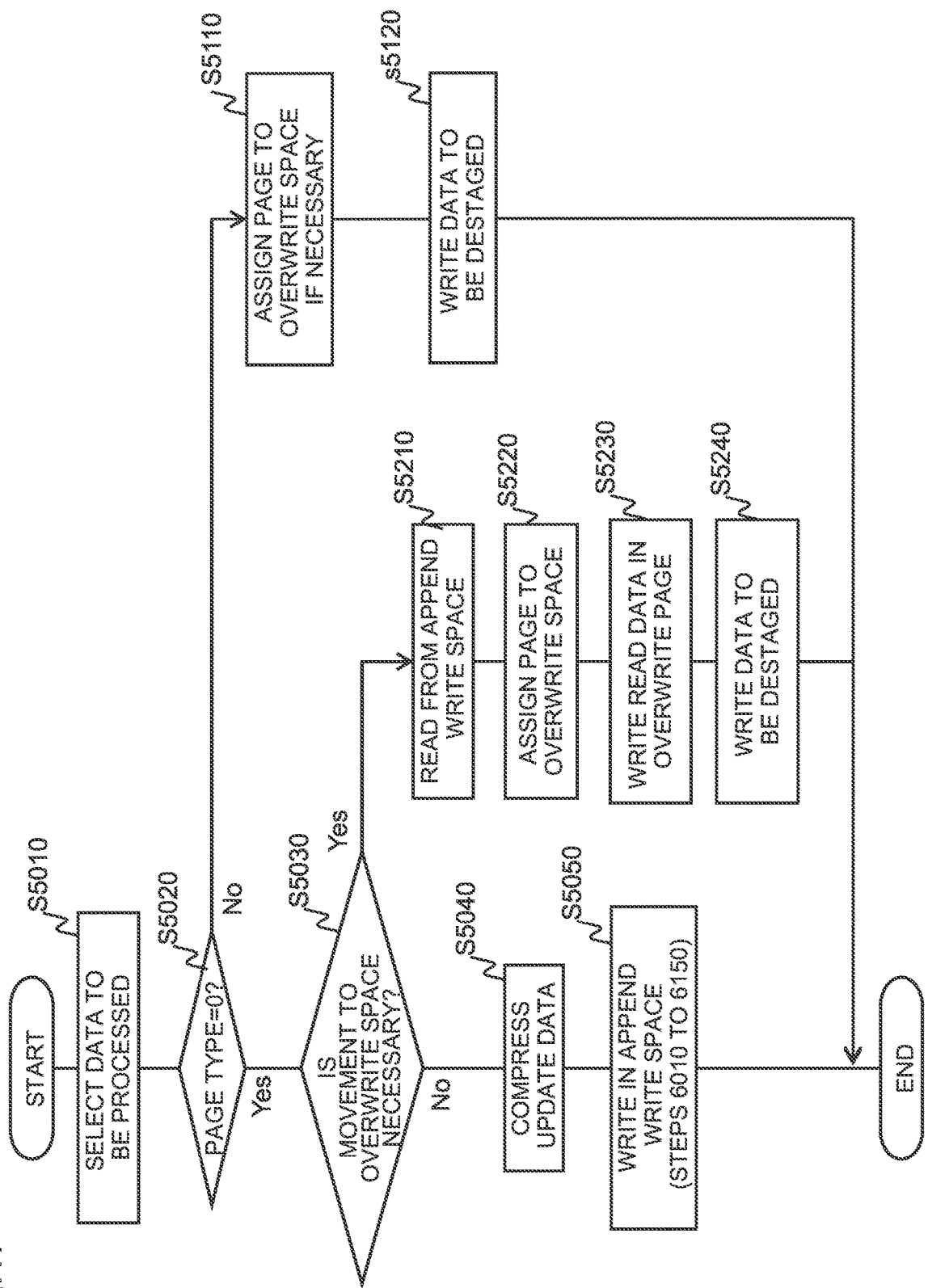
FIG. 17 is a flowchart of a destage process.

Lastly, the flow of a destage process performed by the I/O program 100 at Step 110 is described with FIG. 17.

Step 5010: The I/O program 100 selects data to be processed from pieces of data stored in the cache memory 14. There are various methods for data selection. As an example, there is a method to select the oldest data in terms of the time of write from a host 2. In that case, the storage controller 10 needs to store the time at which each data stored in the cache memory 14 was written from a host 2. In the following, there is described an example of a case where data for one chunk is selected. However, as another practical example, multiple chunks, for example, multiple, continuous chunks on a virtual volume can be selected.

Step 5020: The I/O program 100 identifies a write destination virtual page of the data selected at Step 5010. In the following, there is described an example of a case where VP # p is identified at Step 5020. Then, the I/O program 100 determines, with respect to a record with virtual page # (301) of "p", whether the page type (305) is "0" or "1" by reference to the virtual volume management table 300. If the page type (305) is "1" (Step 5020: No), the data write destination is an overwrite space, and thus Step 5110 is performed next. If the page type (305) is "0" (Step 5020: Yes), Step 5030 is performed next.

Step 5030: If this step is performed, that means the data written in VP # p has been moved to an append write space. In this case, the I/O program 100 determines whether or not to put data of VP # p that has been moved to an append write space back to an overwrite space again.

For example, if almost all chunks in VP # p have been updated, the I/O program 100 determines to put the data of VP # p that has been moved to an append write space back to an overwrite space again. This is because, in this case, since VP # p is likely to continue to be updated frequently, if the data is compressed and stored with each destage, that increases the overhead of a write process. However, this determination method is just an example, and whether or not to put the data of VP # p that has been moved to an append write space back to an overwrite space again can be determined by a determination method other than this. If the determination at Step 5030 is negative, Step 5040 is performed next; if the determination at Step 5030 is positive, Step 5210 is performed next.

Step 5040: The I/O program 100 compresses the data to be processed. This is equal to the processes performed at Steps 1040 to 1060. In the same manner as Steps 1040 to 1060, the I/O program 100 performs the calculation of FPK as well.

Step 5050: The I/O program 100 stores the data to be processed (the compressed chunk) in an append write space. This process is a similar process to Step 1070. That is, the processes at Steps 6010 to 6150 in FIG. 15 are performed. The difference from the processes described in FIG. 15 is that at Step 6210, the I/O program 100 increments the number of metadata reduction chunks (308) in the virtual volume management table 300 by one, instead of incrementing the variable D by one. Other than this, the same processes as those described above are performed. After Step 5050, the data to be processed is deleted from the cache memory 14, the data to be processed and its compressed chunk are deleted from the buffer 700, and the destage process ends.

Step 5210: If the data of VP # p that has been moved to an append write space is determined to be put back to an overwrite space again, the I/O program 100 reads all the data of VP # p that has been moved to an append write space from a storage device 20, and decompresses the data, and then stores the decompressed data in the cache memory 14 temporarily. For this, a similar process to the process described with FIG. 11 can be performed.

Step 5220: The I/O program 100 assigns a physical page to VP # p. Specifically, the I/O program 100 selects one of unused physical pages from the page management table 200, and stores its page # and pool # of a pool to which the page belongs in page # (306) and pool # (307) of a record with virtual page # (301) of p in the virtual volume management table 300, respectively. Furthermore, the I/O program 100 stores "1" in use (204) of the physical page selected from the page management table 200.

Step 5230: The I/O program 100 stores the data read at Step 5210 in the physical page assigned to VP # p. Specifically, in the same manner as Step 13 in FIG. 11, the I/O program 100 identifies DEV # (202) and Addr (203) of a storage device 20 in which the physical page assigned to VP # p exists by reference to the page management table 200. Then, the I/O program 100 stores the data read at Step 5210 in the identified storage device 20.

Step 5240: The I/O program 100 overwrites the physical page assigned to VP # p with the data to be processed, and ends the destage process.

Step 5110: If a physical page has not been assigned to VP # p, the I/O program 100 assigns a physical page. This is a process similar to Step 5220. However, if VP # p has already been assigned a physical page, the assignment of a physical page is not performed.

Step 5120: In the same manner as Step 5240, the I/O program 100 overwrites the physical page assigned to VP # p with the data to be processed, and ends the destage process.

Incidentally, the destage process described here is just an example, and a different process from the process described above can be performed. For example, when data of VP # p has been moved to an append write space, it can be configured to always append the data to the append write space without performing the determination at Step 5030.

Alternatively, when data is put back from an append write space to an overwrite space, the control of reducing the amount of data to be put back can be performed. For example, when a request to update the entire page of VP # p has been received from a host 2, one-page data of VP # p is stored in the cache memory 14. In a case of this state, even if the data is put back from an append write space to an overwrite space, when the data stored in the cache memory 14 is destaged, the data written back from the append write space to the overwrite space is overwritten. Therefore, in such a case, it is more efficient to not put data back from an append write space to an overwrite space.

As described above, the storage apparatus 1 according to Embodiment 1 compresses write data from a host 2, and further performs a deduplication process on the data, and then stores the data in a storage device. Accordingly, as compared with a case where only compression is performed or a case where only a deduplication process is performed, it is possible to further save a storage region.

Furthermore, the storage apparatus 1 according to Embodiment 1 does not enter metadata of a chunk corresponding to a predetermined condition, such as a chunk with a high compression rate (Step 6010: Yes) or a chunk belonging to a virtual page with a high random write rate (Step 6110: No), in the FPMQ 400. The reason why metadata of a chunk meeting a predetermined condition is not entered in the FPMQ 400 is to control the consumption of the cache memory 14. If the storage apparatus 1 enters metadata of all chunks in the FPMQ 400, the size of the FPMQ 400 becomes too large. Therefore, the storage apparatus 1 according to Embodiment 1 suppresses the amount of metadata of chunks entered in the FPMQ 400, and prevents the FPMQ 400 from excessively occupying the cache memory 14.

Furthermore, the reason why metadata of a chunk with a high compression rate is not entered in the FPMQ 400 is that even if a deduplication process is performed on a chunk with a high compression rate (i.e., the size of a compressed chunk is small), the deduplication process is less effective in saving a storage region as compared with a case where a deduplication process is performed on a chunk with a low compression rate.

Moreover, the reason why metadata of a chunk belonging to a virtual page with a high random write rate is not entered in the FPMQ 400 is based on the presumption that a virtual page (a chunk) with a high random write rate is less likely to have duplicate data as compared with a virtual page with a low random write rate (a high sequential write rate). A virtual page with a high sequential write rate (or a virtual volume including this virtual page) is more likely to be used for the purpose of, for example, backup of data. Particularly if multiple generations of backup data are stored in a virtual page (a virtual volume), it can be expected that the same data is more likely to exist. On the other hand, a virtual page with a high random write rate (or a virtual volume including this virtual page) cannot be expected to include such data; therefore, the storage apparatus 1 according to the present embodiment performs the control of not entering metadata of a chunk belonging to a virtual page with a high random write rate in the FPMQ 400. However, these conditions are just an example, and a chunk of which the metadata is not entered in the FPMQ 400 can be selected by another condition.

Embodiment 2

Subsequently, we provide description of a storage apparatus according to Embodiment 2. The storage apparatus 1 according to Embodiment 2 has the same hardware configuration as that described in Embodiment 1. Furthermore, the storage apparatus according to Embodiment 2 has the same programs as those described in Embodiment 1 in the local memory 16, and has the same management information as that described in Embodiment 1 in the cache memory 14.

Moreover, the storage apparatus 1 according to Embodiment 2 has a metadata reduction program 2000 besides the programs described in Embodiment 1. The metadata reduction program 2000 is a program for determining whether the deletion of metadata of a chunk that the deduplication program 1000 has created in the FPMQ 400 is necessary or not and deleting some metadata if necessary.

Figure 18:
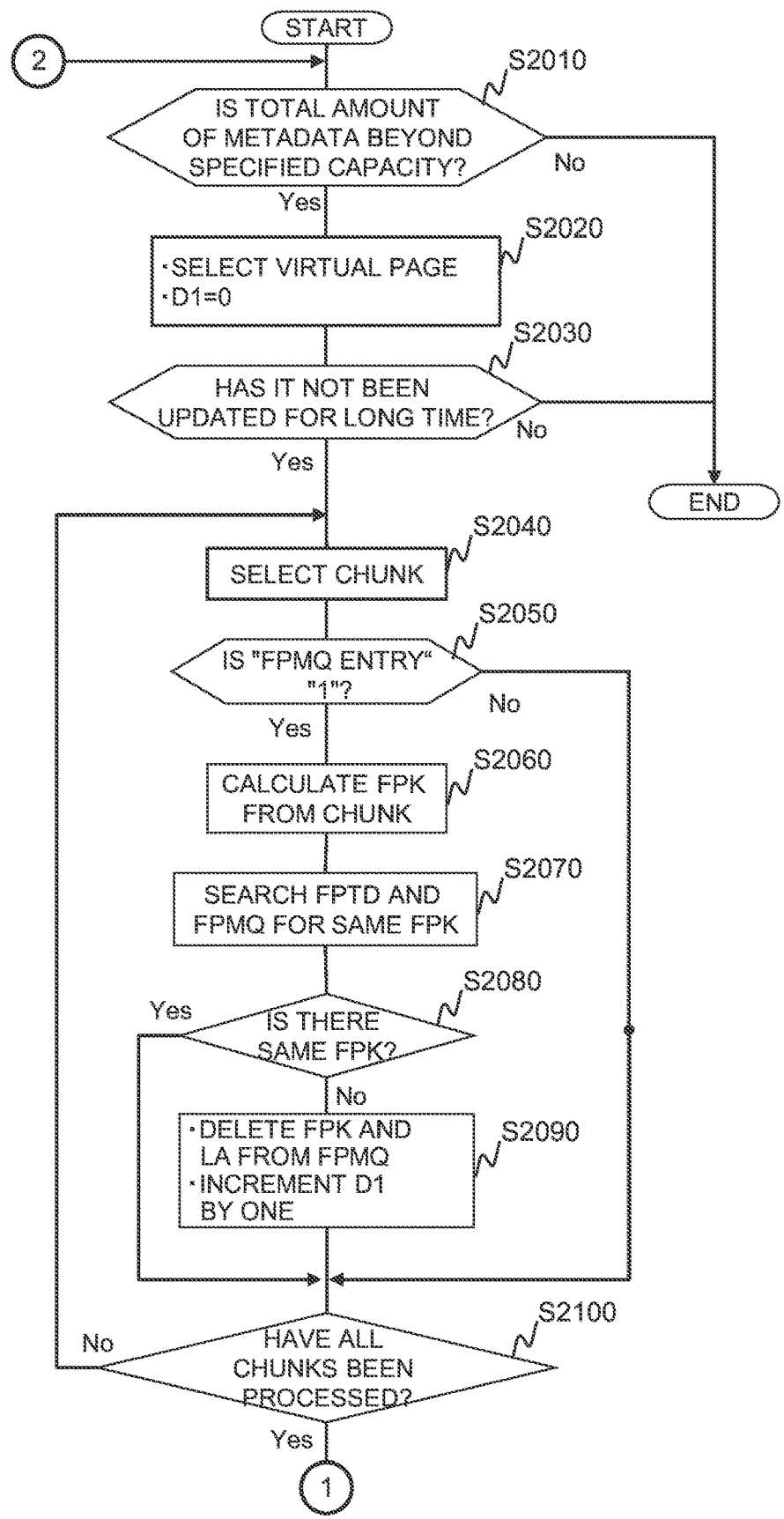
FIG. 18 is a flowchart (1) of a metadata reduction program 2000.
Figure 19:
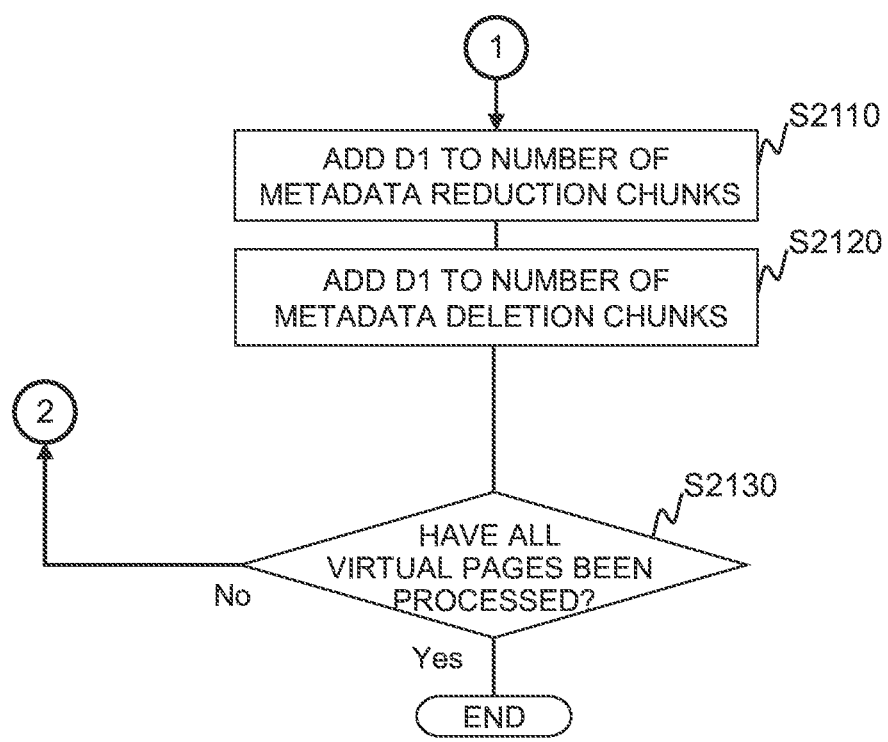
FIG. 19 is a flowchart (2) of the metadata reduction program 2000.

The flow of a process of the metadata reduction program 2000 is described with FIGS. 18 and 19. The metadata reduction program 2000 is executed regularly. Furthermore, the storage apparatus 1 according to Embodiment 2 executes the metadata reduction program 2000 with respect to each pool. In the following, there is described an example where the storage apparatus 1 executes the metadata reduction program 2000 with respect to one particular pool.

Step 2010: The metadata reduction program 2000 determines whether the total size of the FPMQ 400 is more than a predetermined specified value. This determination is equal to the process that the deduplication program 1000 described in Embodiment 1 performs at Step 6110, i.e., the process of determining whether the total size of the FPMQ 400 is more than a predetermined specified value. If the total size of the FPMQ 400 is more than the predetermined specified value (Step 2010: Yes), Step 2020 is performed next. If the total size of the FPMQ 400 is not more than the predetermined specified value (Step 2010: No), the process ends.

Step 2020: Here, the metadata reduction program 2000 prepares a variable D1, and initializes D1 (substitutes 0 for D1). Furthermore, the metadata reduction program 2000 identifies a virtual volume belonging to a pool to be processed by reference to the pool management information 600.

Moreover, by reference to the virtual volume management table 300, the metadata reduction program 2000 selects one virtual page to be processed from the identified virtual volume. Specifically, the metadata reduction program 2000 selects one with the oldest last update time (304) from virtual pages whose page type (305) is "0" and that have not been subjected to the processes at Steps 2030 and onward. This is because a virtual page whose page type (305) is "1" has a chunk existing in a physical page assigned to an overwrite space, and metadata of the chunk has not been created. Furthermore, this is because a virtual page with the oldest last update time (304) means that the virtual page has not been updated from a host 2 for long, and, of chunks in this virtual page, metadata of a chunk that is not duplicated with other chunks may be deleted preferentially.

Step 2030: With respect to the virtual page selected at Step 2020, the metadata reduction program 2000 calculates a difference between the current time and the last update time (304), and determines whether this difference is more than a predetermined threshold. If the difference is more than the predetermined threshold (i.e., the virtual page has not been updated for the predetermined threshold or longer), Step 2040 is performed next. If the difference is less than the predetermined threshold (Step 2030: No), that means there is no virtual page that has not been updated for the predetermined threshold or longer in the pool to be processed. In that case, the metadata reduction program 2000 ends the process.

Step 2040: The metadata reduction program 2000 selects, from the virtual page selected at Step 2020, one of (LAs of) chunks that have not been subjected to the processes at Steps 2040 and onward. The method of selecting a chunk is arbitrary. For example, a chunk can be selected in ascending order of LA. Incidentally, in the following, there is described on the assumption that an LA of the chunk selected here is "L".

Step 2050: By reference to the LP conversion table 500, the metadata reduction program 2000 determines whether FPMQ entry (505) of the chunk selected at Step 2040 is "1" or "0". If FPMQ entry (505) is "1" (Step 2050: Yes), Step 2060 is performed next. On the other hand, if FPMQ entry (505) is "0" (Step 2050: No), Steps 2060 to 2090 are skipped.

Step 2060: The metadata reduction program 2000 reads (a compressed chunk of) the chunk selected at Step 2040 from a storage device 20, generates a chunk by decompressing the compressed chunk, and calculates an FPK of the chunk. However, as another practical example, in a case where the storage apparatus 1 is configured to generate an FPK from a compressed chunk, the metadata reduction program 2000 generates an FPK by using the compressed chunk read from the storage device 20.

Steps 2070 and 2080: The metadata reduction program 2000 determines whether the same FPK as the FPK calculated at Step 2060 has been stored in the FPMQ 400. This determination is similar to Step 6020; however, at Step 2070, of records of the FPMQ 400, a record of "L" in LA (402) is exempted from the determination. This is because the record of "L" in LA (402) is metadata of a chunk to be processed. If the same FPK as the FPK calculated at Step 2060 has been stored in the FPMQ 400 (Step 2080: Yes), Step 2090 is skipped. If the same FPK as the FPK calculated at Step 2060 does not exist in the FPMQ 400 (Step 2080: No), Step 2090 is performed next.

Step 2090: The metadata reduction program 2000 deletes metadata of the chunk to be processed from the FPMQ 400. Furthermore, the metadata reduction program 2000 increments D1 by one.

Step 2100: If the processes at Steps 2050 to 2090 have been performed on all the chunks (Step 2100: Yes), Step 2110 is performed next. If there remains a chunk on which the processes at Steps 2050 to 2090 have not yet been performed (Step 2100: No), the metadata reduction program 2000 again performs the process from Step 2040.

Step 2110: The metadata reduction program 2000 adds the value of the variable D1 to the number of metadata reduction chunks (308) in the virtual volume management table 300, and ends the process.

Step 2120: The metadata reduction program 2000 adds the value of the variable D1 to the number of metadata deletion chunks (603) in the pool management information 600.

Step 2130: The metadata reduction program 2000 determines whether there is a virtual page to be processed next. Specifically, whether there remains a virtual page whose page type (305) is "0" that has not yet been subjected to the processes up to Step 2120 is determined. If there remains a virtual page to be processed next (Step 2130: No), the metadata reduction program 2000 repeats the process from Step 2010 again. If there remains no virtual page to be processed (Step 2130: Yes), the metadata reduction program 2000 ends the process.

In this way, if the total size of the FPMQ 400 is more than the predetermined specified value, the metadata reduction program 2000 deletes metadata of, of chunks that have not been updated for long, a chunk that is not a duplicate chunk from the FPMQ 400. Accordingly, it is possible to prevent metadata of chunks from increasing excessively.

Incidentally, in Embodiment 2 described above, there is described an example where the storage apparatus 1 performs the same processes as those described in Embodiment 1, except for the process of the metadata reduction program 2000. That is, the deduplication program 1000 in Embodiment 2 also performs the processes described in Embodiment 1 (the processes of FIGS. 14 and 15). As described in Embodiment 1, if a chunk meets a predetermined condition (for example, having a high compression rate, or belonging to a virtual page with a high random write rate), the deduplication program 1000 does not enter metadata of the chunk in the FPMQ 400.

However, in the storage apparatus according to Embodiment 2, the metadata reduction program 2000 is executed; thereby metadata of a less-needed chunk is deleted from the FPMQ 400. Therefore, as a variation of Embodiment 2, the deduplication program 1000 can be configured to always enter metadata of a chunk in the FPMQ 400. That is, the deduplication program 1000 can be configured to not perform the determination at Step 6010 and the determination at Step 6110 in FIG. 15 and to be sure to perform Step 6060 or Step 6120.

Embodiment 3

Subsequently, we provide description of a storage apparatus according to Embodiment 3. The storage apparatus 1 according to Embodiment 3 has the same hardware configuration as that described in Embodiment 1 or 2. Furthermore, the storage apparatus 1 according to Embodiment 3 holds at least the same programs as those described in Embodiment 2 in the local memory 16, and has the same management information as that described in Embodiment 2 in the cache memory 14.

Moreover, the storage apparatus 1 according to Embodiment 3 has a metadata re-creation program 3000 besides the programs described in Embodiment 2. The metadata re-creation program 3000 is a program for re-creating metadata of a chunk that has been deleted by the metadata reduction program 2000.

Figure 20:
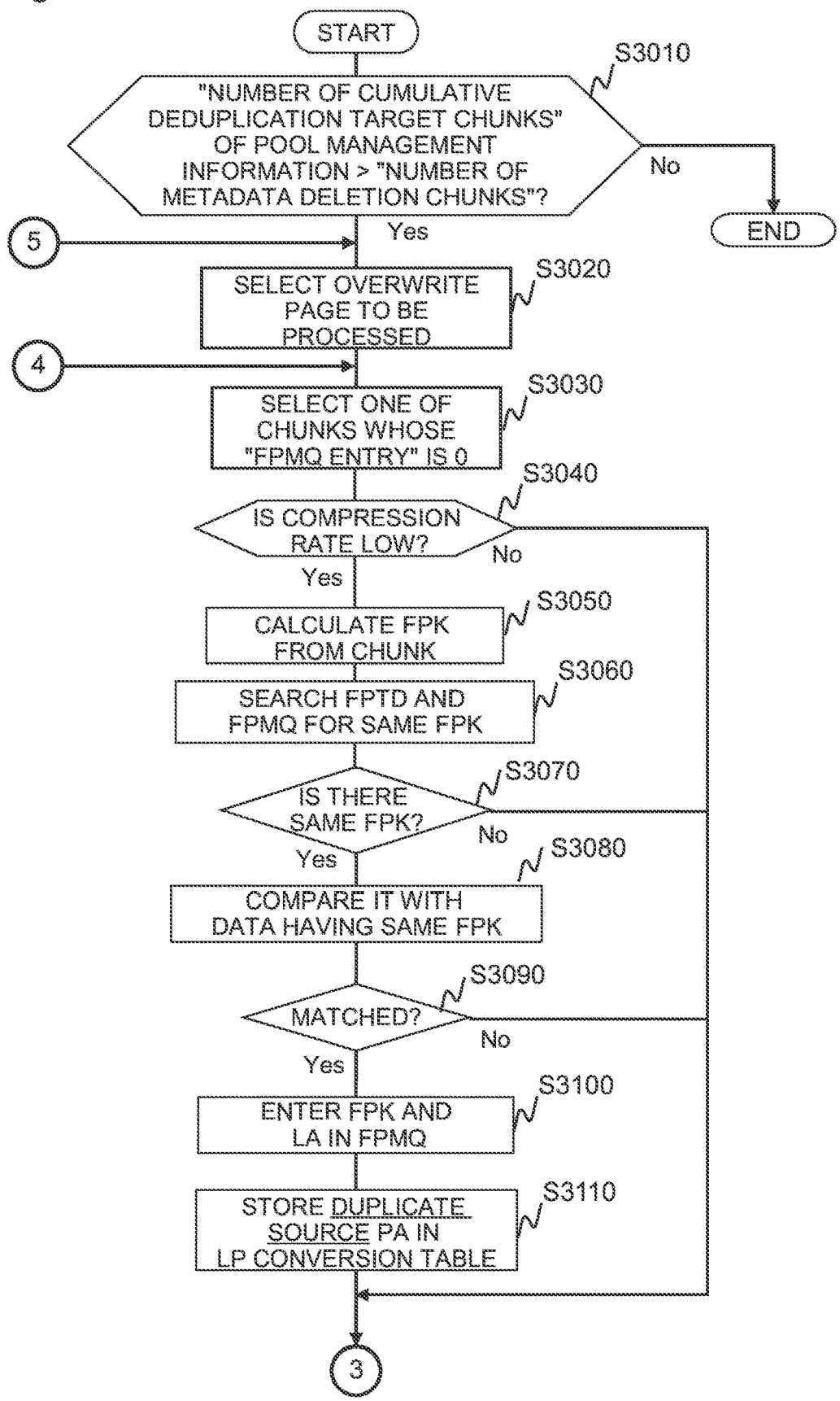
FIG. 20 is a flowchart (1) of a metadata re-creation program 3000.
Figure 21:
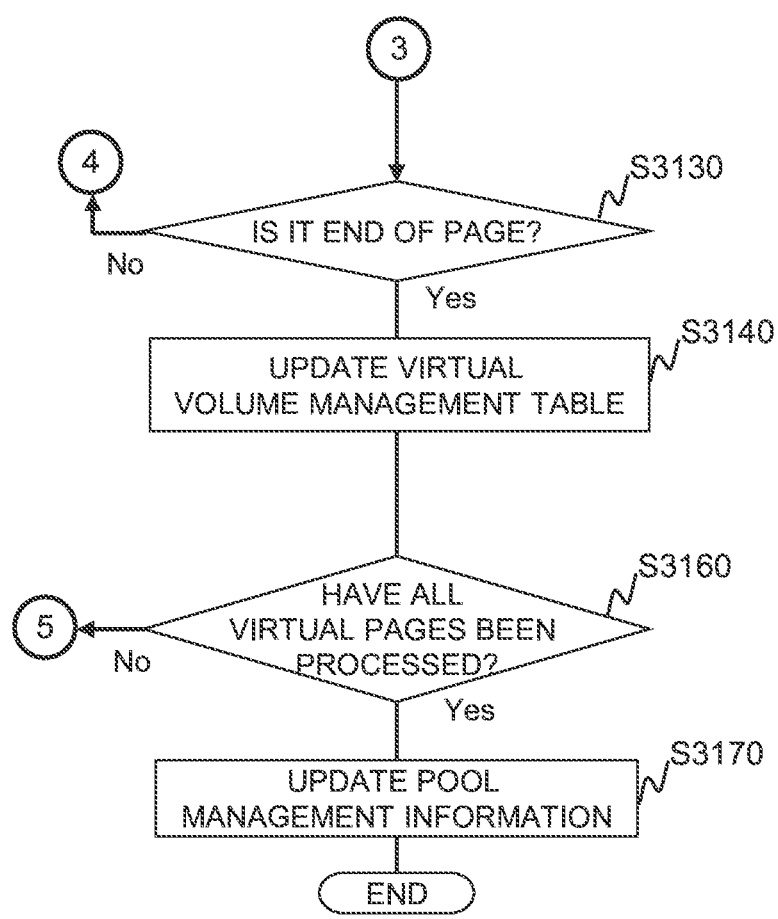
FIG. 21 is a flowchart (2) of the metadata re-creation program 3000.

The flow of a process of the metadata re-creation program 3000 is described with FIGS. 20 and 21. The metadata re-creation program 3000 is executed regularly. Furthermore, the storage apparatus 1 according to Embodiment 3 executes the metadata re-creation program 3000 with respect to each pool. In the following, there is described an example where the storage apparatus 1 executes the metadata re-creation program 3000 with respect to one particular pool, for example, a pool with pool number 0 (this is written as "pool #0").

Step 3010: By reference to the pool management information 600, the metadata re-creation program 3000 determines whether the number of cumulative deduplication target chunks (602) of pool #0 is more than the number of metadata deletion chunks (603). If the number of cumulative deduplication target chunks (602) is equal to or less than the number of metadata deletion chunks (603) (Step 3010: No), the metadata re-creation program 3000 ends the process; if not, Step 3020 is performed next.

Step 3020: By reference to the pool management information 600, the metadata re-creation program 3000 identifies a virtual volume belonging to the pool to be processed. Furthermore, by reference to the virtual volume management table 300, the metadata re-creation program 3000 selects a virtual page to be processed from virtual pages of the identified virtual volume. Moreover, the metadata re-creation program 3000 prepares a variable P, and initializes P (substitutes 0 for P).

Here, the metadata re-creation program 3000 selects a virtual page of which the number of metadata reduction chunks (308) is at least one or more. This is because a virtual page of which the number of metadata reduction chunks (308) is 0 means that metadata of a chunk has not been deleted so far, and a chunk whose metadata is to be re-created does not exist in such a virtual page. In the following, of virtual pages belonging to a pool to be processed, a virtual page of which the number of metadata reduction chunks (308) is one or more is referred to as a processing candidate virtual page.

Step 3030: By reference to the LP conversion table 500, the metadata re-creation program 3000 selects, of chunks that have not been subjected to the processes at Steps 3040 and onward, one chunk whose FPMQ entry (505) is "0" (a chunk whose metadata has not been entered in the FPMQ 400). Hereinafter, the chunk selected here is referred to as the "chunk to be processed". The method of selecting a chunk is arbitrary. For example, a chunk can be selected in ascending order of LA.

Step 3040: The chunk selected at Step 3030 (the chunk to be processed) has actually been stored in an append write space as a compressed chunk. The metadata re-creation program 3000 calculates a compression rate of the chunk to be processed. The size of a chunk is fixed (for example, 8 KB), and the size of the chunk after compression has been recorded in Length (504) in the LP conversion table 500; therefore, using the size of the chunk and Length (504) of the chunk to be processed, the metadata re-creation program 3000 calculates a compression rate. If the calculated compression rate is smaller than a threshold, Step 3050 is performed next. On the other hand, if the calculated compression rate is equal to or more than the threshold, Steps 3050 to 3110 are skipped. Incidentally, this threshold is a threshold for determining whether or not to create metadata, and is the same value as the threshold used in the process at Step 6010 described in Embodiment 1. However, as another practical example, a different value of threshold from the threshold used at Step 6010 can be used.

Step 3050: The metadata re-creation program 3000 reads (a compressed chunk of) the chunk to be processed from a storage device 20 and calculates an FPK. This process is equal to Step 1050.

Step 3060: The metadata re-creation program 3000 determines whether the same FPK as the FPK calculated at Step 3050 has been stored in the FPMQ 400. This is the same process as Step 6020 and the like.

Step 3070: As a result of Step 3060, if the same FPK as the FPK calculated at Step 3050 has been stored in the FPMQ 400, Step 3080 is performed next. On the other hand, if the same FPK as the FPK calculated at Step 3050 has not been stored in the FPMQ 400, Steps 3080 to 3110 are skipped.

Step 3080: The metadata re-creation program 3000 reads a chunk (a compressed chunk) having the same FPK as the FPK found at Step 3050 from a storage device 20, compares the content of the chunk (the compressed chunk) read at Step 3050 with this, and determines whether the two are identical or not. This process is a similar process to Step 6040. In the same manner as Step 6040, at Step 3080, by reference to the FPMQ 400 and the LP conversion table 500, the metadata re-creation program 3000 identifies a PA in which a chunk (a compressed chunk) having the same FPK as the FPK found at Step 3050 has been stored and the length of the PA. Hereinafter, this chunk is referred to as the "duplicate candidate chunk". Furthermore, in the following, there is described an example of a case where the PA of the duplicate candidate chunk is "PA1".

Step 3090: As a result of Step 3080, if the chunk to be processed and the duplicate candidate chunk have the same content (Step 3090: Yes), Step 3100 is performed next. If the two are different (Step 3090: No), Steps 3100 and 3110 are skipped.

Step 3100: The metadata re-creation program 3000 enters metadata of the chunk to be processed in the FPMQ 400. Furthermore, the metadata re-creation program 3000 stores "1" in FPMQ entry (505) of, of records of the LP conversion table 500, a record with an LA (501) coincident with the LA of the chunk to be processed, and increments the variable P by one.

Step 3110: The metadata re-creation program 3000 stores the PA of the duplicate candidate chunk (i.e., PA1) in PA (503) of, of the records of the LP conversion table 500, the record with an LA (501) coincident with the LA of the chunk to be processed, and stores the length of the duplicate candidate chunk in Length (504).

Step 3130: The metadata re-creation program 3000 determines whether all chunks in the page have been subjected to the processes up to Step 3110. If all chunks in the page have been subjected to the processes up to Step 3110 (Step 3130: Yes), Step 3140 is performed next. If there remains a chunk that has not yet been subjected to the processes up to Step 3110, the metadata re-creation program 3000 performs Step 3030 again.

Step 3140: The metadata re-creation program 3000 updates information of the virtual page recorded in the virtual volume management table 300. Specifically, the value of the variable P (the number of chunks whose metadata has been created) is reduced from the number of metadata reduction chunks (308) of the virtual page.

Step 3160: The metadata re-creation program 3000 determines whether there is a virtual page that has not yet been subjected to the processes up to Step 3140 in processing candidate virtual pages included in the pool. If all the processing candidate virtual pages have been subjected to the processes up to Step 3140 (Step 3160: Yes), the metadata re-creation program 3000 performs Step 3170 next, and ends the process. If there remains a virtual page that has not yet been subjected to the processes up to Step 3140, the metadata re-creation program 3000 performs Step 3020 again.

Step 3170: The metadata re-creation program 3000 updates information of pool #0 in the pool management information 600. Specifically, the number of cumulative deduplication target chunks (602) of pool #0 is initialized (is set to 0). Furthermore, the value of the variable P is reduced from the number of metadata deletion chunks (603) of pool #0. When these processes have been completed, the metadata re-creation program 3000 ends the process.

In this way, the storage apparatus according to Embodiment 3 re-creates metadata of a chunk that has been deleted once by the metadata reduction program 2000. As described in Embodiment 2, the storage apparatus according to Embodiment 2 or 3 deletes metadata of, of chunks that have not been updated for long, a chunk that is not a duplicate chunk.

However, after the deletion of metadata, a chunk having the same content as the chunk whose metadata has been deleted may be written. As can be seen from the process of the deduplication program 1000 described in Embodiment 1 (particularly, FIG. 15), if metadata of a chunk has been deleted, even when a chunk having the same content as the chunk is written from a host, a deduplication process is not performed. Therefore, with respect to a chunk whose metadata has been deleted once, the storage apparatus according to Embodiment 3 performs re-creation of metadata of the chunk, thereby reducing the amount of storage data.

Incidentally, in Embodiment 3, there is described an example where when the number of cumulative deduplication target chunks (602) becomes more than the number of metadata deletion chunks (603), re-creation of metadata of the chunk is performed (Step 3010). However, the method of determining whether the re-creation of metadata is necessary or not is not limited to this. The re-creation of metadata of a chunk can be performed if a predetermined condition is met. For example, it can be assumed that if the amount of a chunk newly written in an append write space increases, the likelihood of the existence of duplicate data increases. Therefore, the re-creation of metadata can be performed when a condition that the number of cumulative deduplication target chunks (602) becomes more than a predetermined threshold (fixed value) is met. Alternatively, the re-creation of metadata of a chunk can be performed when a predetermined time has passed since the execution of the metadata reduction program 2000.

The embodiments of the present invention are described above; however, these are just an example for the explanation of the present invention, but not the intent to limit the scope of the present invention to only these embodiments. That is, the present invention can be embodied in various other forms. For example, in the above, there is provided an example where the storage apparatus includes two types of memories: the cache memory and the local memory; as another practical example, the storage apparatus can be configured to include either one of the memories, i.e., either the cache memory or the local memory. In that case, all pieces of information are stored in the cache memory (or the local memory).

Furthermore, the storage apparatus can be equipped with hierarchical storage management (HSM) function. For example, the HSM function can be configured to manage the storage hierarchy composed of the cache memory and the storage devices. Accordingly, when the size of management information, such as FPMQ, increases, the HSM function can be configured to, for example, move some records of FPMQ to a storage device and, at the point at which there arises the need for access to (a record of) the FPMQ that has been moved to the storage device, recall the record from the storage device to the cache memory.

Moreover, in the above, there is described an example where some of the information used by the storage apparatus are managed by the table structure, such as the page management table 200; however, it is not limited to a form in which information is managed by the table structure. The storage apparatus can manage information, using the data structure other than a table, for example, the list structure.

Furthermore, in the embodiments described above, there is described an example where the storage apparatus counts and manages the number of cumulative deduplication target chunks and the number of metadata deletion chunks; however, these pieces of information are information used by the storage apparatus according to Embodiment 3. Therefore, the storage apparatus according to Embodiment 1 or 2 does not always have to hold the number of cumulative deduplication target chunks and the number of metadata deletion chunks.

Moreover, in the embodiments described above, data stored in an append write space is compressed data; however, when a chunk is moved to an append write space, only a deduplication process can be performed without performing compression.

Furthermore, in the computer system according to the embodiments described above, the hosts and the storage apparatus exist as different hardware; however, the computer system can adopt a configuration other than this. For example, it can be configured that a host is equipped with one or more storage devices, and a CPU of the host executes the programs described in the above embodiments.

DESCRIPTION OF REFERENCE NUMERALS 1 storage apparatus
2 host
3 SAN
5 management host
10 storage controller
11 CPU
12 host I/F
13 device I/F
14 cache memory
15 management I/F
16 local memory
20 storage device

The invention claimed is:

1. A storage apparatus comprising:
one or more storage devices; and
a storage controller configured to:
manage a plurality of storage regions of the one or more storage devices,
manage a volume provided to a host, manage an append storage space which is different from the volume,
manage mapping information which indicates correspondences between the volume and the storage regions, correspondences between the append storage space and the storage regions, and correspondences between addresses in the volume and addresses in the append storage space,
record management information which indicates correspondences between feature values of compressed data stored in the append storage space and addresses in the volume,
upon receiving a write request to store write data at a storage position of the volume from the host, dynamically assign a first storage region to the storage position of the volume and record a correspondence between the storage position of the volume and the first storage region in the mapping information, and
store the write data in the first storage region,
wherein the storage controller is further configured to perform deduplication processing, for each respective chunk of the write data stored in the first storage region, which includes to:
generate compressed data by reading the respective chunk of the write data at a respective address in the volume and compressing the respective chunk of the write data, and
calculate a feature value of the compressed data,
in a case where the respective chunk does not meet a predetermined condition, where the feature value for the address of the append storage space matches the feature value of the compressed data, and where the data at the address in the append storage space matches the compressed data:
update the respective address of the respective chunk in the volume to correspond to the address of the append storage space in the mapping information, and
in a case where the respective chunk does not meet the predetermined condition, and where the feature value for the address of the append storage space does not match the feature value of the compressed data or where the data at the address in the append storage space does not match the compressed data:
record the feature value of the compressed data and the respective address of the respective chunk in the volume in the management information,
store the compressed data at a new address in the append storage space, and
update the respective address of the respective chunk in the volume to correspond to the new address of the append storage space in the mapping information,
in a case where the respective chunk does meet the predetermined condition:
not record the feature value of the compressed data and the respective address of the respective chunk in the volume in the management information, and
store the compressed data at a new address in the append storage space, and
update the respective address of the respective chunk in the volume to correspond to the new address of the append storage space in the mapping information.

2. The storage apparatus according to claim 1, wherein the storage controller is further configured to:
in a case where an amount of metadata, which is the correspondences between feature values of compressed data stored in the append storage space and addresses in the volume, recorded in the management information becomes more than a specified value, delete the metadata whose feature values are not duplicated with other data from the management information.

3. The storage apparatus according to claim 2, wherein the storage controller is further configured to:
when a predetermined condition is fulfilled,
with respect to the write data of which the metadata has not been recorded in the management information or the management information which has been deleted, create the metadata.

4. The storage apparatus according to claim 3, wherein
the storage controller manages a sum of the number of times the metadata has been deleted from the management information and the number of times the metadata has not been recorded in the management information and the number of times the metadata has been recorded in the management information, and in an event that the number of times the metadata has been recorded in the management information becomes more than the sum of the number of times the metadata has been deleted and the number of times the metadata has not been recorded as a trigger, with respect to the write data of which the metadata has not been recorded in the management information or the write data of which the metadata has been deleted, the storage controller performs creation of the metadata and records the metadata in the management information.

5. The storage apparatus according to claim 1, wherein the storage controller compresses the write data, and stores the write data in the one or more storage devices.

6. The storage apparatus according to claim 5, wherein the storage controller is further configured to:
dynamically assign a second storage region to the new address in the append storage space, and
store the compressed data at a new address in the append storage space.

7. The storage apparatus according to claim 6, wherein the storage controller is further configured to:
after performing the deduplication processing for each respective chunk of the write data in the first storage region, update the mapping information to change the first storage region to an unused state.

8. The storage apparatus according to claim 1, wherein the predetermined condition is that a write rate of the first storage region is larger than a given value.

9. The storage apparatus according to claim 1, wherein the predetermined condition is that a compression rate of the respective chunk is larger than a given value.

10. A storage medium on which a program has been recorded, the program causing a processor of a computer, including the processor, a memory, and one or more storage devices, to perform acts comprising:
managing a plurality of storage regions of the one or more storage devices,
managing a volume provided to a host, manage an append storage space which is different from the volume,
managing mapping information which indicates correspondences between the volume and the storage regions, correspondences between the append storage space and the storage regions, and correspondences between addresses in the volume and addresses in the append storage space,
recording management information which indicates correspondences between feature values of compressed data stored in the append storage space and addresses in the volume,
upon receiving a write request to store write data at a storage position of the volume from the host, dynamically assigning a first storage region to the storage position of the volume and recording a correspondence between the storage position of the volume and the first storage region in the mapping information, and
storing the write data in the first storage region,
wherein the storage controller is further configured to perform deduplication processing, for each respective chunk of the first storage region, which includes:
generating compressed data by reading the respective chunk of the write data at a respective address in the volume and compressing the respective chunk of the write data, and
calculating a feature value of the compressed data,
in a case where the respective chunk does not meet a predetermined condition, where the feature value for the address of the append storage space matches the feature value of the compressed data, and where the data at the address in the append storage space matches the compressed data:
updating the respective address of the respective chunk in the volume to correspond to the address of the append storage space in the mapping information, and
in a case where the respective chunk does not meet the predetermined condition, and where the feature value for the address of the append storage space does not match the feature value of the compressed data or where the data at the address in the append storage space does not match the compressed data:
recording the feature value of the compressed data and the respective address of the respective chunk in the volume in the management information,
storing the compressed data at a new address in the append storage space, and
updating the respective address of the respective chunk in the volume to correspond to the new address of the append storage space in the mapping information, and
in a case where the respective chunk does meet the predetermined condition:
not recording the feature value of the compressed data and the respective address of the respective chunk in the volume in the management information,
storing the compressed data at a new address in the append storage space, and
updating the respective address of the respective chunk in the volume to correspond to the new address of the append storage space in the mapping information.

11. The storage medium according to claim 10, wherein the acts further comprise:
in a case where an amount of metadata, which is the correspondences between feature values of compressed data stored in the append storage space and addresses in the volume, recorded in the management information becomes more than a specified value, delete the metadata whose feature values are not duplicated with other data from the management information.

12. The storage medium according to claim 11, wherein the acts further comprise:
when fulfilling a predetermined condition, with respect to the write data of which the metadata has not been recorded in the management information or the management information which has been deleted, create the metadata.

13. A storage apparatus comprising:
one or more storage devices;
a memory configured to store management information which indicates correspondences between feature values of compressed data stored in an append storage space and addresses in a volume; and
a storage controller configured to:
manage a plurality of storage regions of the one or more storage devices,
manage the volume provided to a host,
manage the append storage space which is different from the volume, manage mapping information which indicates correspondences between the volume and the storage regions, correspondences between the append storage space and the storage regions, and correspondences between addresses in the volume and addresses in the append storage space, and upon receiving a write request to store write data at a storage position of the volume from the host, store the write data in a first storage region of the plurality of storage regions which corresponds to the storage position of the volume, and record a correspondence between the storage position of the volume and the first storage region in the mapping information, wherein the storage controller is further configured to perform deduplication processing, for each respective chunk of the write data stored in the first storage region, which includes to:

generate compressed data by reading the respective chunk of the write data at a respective address in the volume and compressing the respective chunk of the write data, and calculate a feature value of the compressed data, in a case where the respective chunk does not meet a predetermined condition, where the feature value for the address of the append storage space matches the feature value of the compressed data, and where the data at the address in the append storage space matches the compressed data:

update the respective address of the respective chunk in the volume to correspond to the address of the append storage space in the mapping information, and in a case where the respective chunk does not meet the predetermined condition, and where the feature value for the address of the append storage space does not match the feature value of the compressed data or where the data at the address in the append storage space does not match the compressed data:

record the feature value of the compressed data and the respective address of the respective chunk in the volume in the management information, store the compressed data at a new address in the append storage space, and update the respective address of the respective chunk in the volume to correspond to the new address of the append storage space in the mapping information, in a case where the respective chunk does meet the predetermined condition:

not record the feature value of the compressed data and the respective address of the respective chunk in the volume in the management information, and store the compressed data at a new address in the append storage space, and update the respective address of the respective chunk in the volume to correspond to the new address of the append storage space in the mapping information, and wherein the storage controller is further configured to:

after performing the deduplication processing for each respective chunk of the write data in the first storage region, update the mapping information to change the first storage region to an unused state.

* * * * *